US011008658B2

(12) United States Patent
Claridge et al.

(10) Patent No.: US 11,008,658 B2
(45) Date of Patent: May 18, 2021

(54) CONTROLLED GROWTH OF ULTRANARROW NANOWIRES ON FUNCTIONALIZED 2D MATERIALS

(71) Applicants: Shelley A. Claridge, Lafayette, IN (US); Ashlin Porter, Lafayette, IN (US)

(72) Inventors: Shelley A. Claridge, Lafayette, IN (US); Ashlin Porter, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 224 days.

(21) Appl. No.: 16/288,577

(22) Filed: Feb. 28, 2019

(65) Prior Publication Data

US 2019/0264332 A1 Aug. 29, 2019

Related U.S. Application Data

(60) Provisional application No. 62/636,200, filed on Feb. 28, 2018.

(51) Int. Cl.
  *C23C 18/44* (2006.01)
  *C23C 18/18* (2006.01)
  *B05D 1/20* (2006.01)

(52) U.S. Cl.
  CPC .......... *C23C 18/44* (2013.01); *C23C 18/1882* (2013.01); *B05D 1/208* (2013.01)

(58) Field of Classification Search
  CPC .......... B05D 3/065; B05D 1/20; B05D 1/208; B05D 7/24; B05D 7/52; B05D 2203/30; B05D 2518/00; C23C 18/44; C23C 18/1882; C23C 18/1657; B82Y 10/00; B82Y 40/00; B82Y 30/00; H01L 21/02603; H01L 21/02425; H01L 21/02628; H01L 29/0669; H01L 21/02658
  See application file for complete search history.

(56) References Cited

PUBLICATIONS

Highly oriented pyrolytic graphite. PAC, 1995, 67, 473 (IUPAC Recommendations 1995) on p. 495. IUPAC. Compendium of Chemical Terminology, 2nd ed. (the "Gold Book"). Compiled by A. D. McNaughtand A. Wilkinson. Blackwell Scientific Publications, Oxford (1997). (Year: 1997).*
Loubat, A.; Escoffier, W.; Lacroix, L.-M.; Viau, G.; Tan, R.; Carrey, J.; Warot-Fonrose, B.; Raquet, B. Cotunneling Transport in Ultra-Narrow Gold Nanowire Bundles. Nano Research 2013, 6 (9), 644-651 (Year: 2013).*
Bang, J. J.; Rupp, K. K.; Russell, S. R.; Choong, S. W.; Claridge, S. A. Sitting Phases of Polymerizable Amphiphiles for Controlled Functionalization of Layered Materials. Journal of the American Chemical Society 2016, 138 (13), 4448-4457. (Year: 2016).*
Villarreal, T. A.; Russell, S. R.; Bang, J. J.; Patterson, J. K.; Claridge, S. A. Modulating Wettability of Layered Materials by Controlling Ligand Polar Headgroup Dynamics. Journal of the American Chemical Society 2017, 139 (34), 11973-11979. (Year: 2017).*
Mann, J. A.; Dichtel, W. R., Noncovalent Functionalization of Graphene by Molecular and Polymeric Adsorbates, J. Phys. Chem. Lett. 2013, 4, 2649-2657.
Macleod, J. M.; Rosei, F., Molecular Self-Assembly on Graphene, Small 2014, 10, 1038-1049.
Bang, J. J.; Rupp, K. K.; Russell, S. R.; Choong, S. W.; Claridge, S. A., Sitting Phases of Polymerizable Amphiphiles for Controlled Functionalization of Layered Materials, J. Am. Chem. Soc. 2016, 138, 4448-4457.
Okawa, Y.; Aono, M., Linear Chain Polymerization Initiated by a Scanning Tunneling Microscope Tip at Designated Positions, J. Chem. Phys. 2001, 115, 2317-2322.
Grim, P. C. M.; De Feyter, S.; Gesquiere, A.; Vanoppen, P.; Rucker, M.; Valiyaveettil, S.; Moessner, G.; Mullen, K.; De Schryver, F. C., Submolecularly Resolved Polymerization of Diacetylene Molecules on the Graphite Surface Observed with Scanning Tunneling Microscopy, Angew. Chem., Int. Ed. 1997, 36, 2601-2603.
Okawa, Y.; Akai-Kasaya, M.; Kuwahara, Y.; Mandal, S. K.; Aono, M., Controlled Chain Polymerisation and Chemical Soldering for Single-Molecule Electronics, Nanoscale 2012, 4, 3013-3028.
Hayes, T. R.; Bang, J. J.; Davis, T. C.; Peterson, C. F.; McMillan, D. G.; Claridge, S. A., Multimicrometer Noncovalent Monolayer Domains on Layered Materials through Thermally Controlled Langmuir-Schaefer Conversion for Noncovalent 2D Functionalization, ACS Appl. Mater. Interf. 2017, 9, 36409-36416.
Jiang, H.; Jelinek, R., Dramatic Shape Modulation of Surfactant/ Diacetylene Microstructures at the Air-Water Interface, Chem. Eur. J. 2014, 20, 16747-16752.
Choong, S. W.; Russell, S. R.; Bang, J. J.; Patterson, J. K.; Claridge, S. A., Sitting Phase Monolayers of Polymerizable Phospholipids Create Dimensional, Molecular-Scale Wetting Control for Scalable Solution Based Patterning of Layered Materials, ACS Appl. Mater. Interf. 2017, 9, 19326-19334.
Wang, C.; Hu, Y. J.; Lieber, C. M.; Sun, S. H., Ultrathin Au Nanowires and Their Transport Properties, J. Am. Chem. Soc. 2008, 130, 8902-8903.
Huo, Z. Y.; Tsung, C. K.; Huang, W. Y.; Zhang, X. F.; Yang, P. D., Sub-Two Nanometer Single Crystal A Nanowires, Nano Lett. 2008, 8, 2041-2044.

(Continued)

*Primary Examiner* — William P Fletcher, III
(74) *Attorney, Agent, or Firm* — Purdue Research Foundation; Liang Zeng Yan

(57) ABSTRACT

A method for preparing a nanowire or nanorod on a patterned monolayer or thin film supported by a 2D material substrate in a nonpolar environment comprises the steps of: functionalizing a supporting 2D material substrate using a patterned monolayer or thin film of a polymerized amphiphiles comprising both hydrophobic and hydrophilic constituents; and then growing a nanowire or nanorod on the functionalized supporting 2D material substrate in a salt solution or suspension, wherein the patterned monolayer or thin film comprises a polymerizable phospholipid with a terminal amine. A gold nanowire or nanorod so prepared has a highly controlled diameter of about 2 nm, and a length of about 100 nm, dependent in part on molecular domain sizes in the monolayer.

19 Claims, 14 Drawing Sheets

(56) References Cited

PUBLICATIONS

Reiser, B.; Gerstner, D.; Gonzalex-Garcia, L.; Maurer, J. H. M.; Kanelidis, I.; Kraus, T., Multivalent Bonds in Self-Assembled Bundles of Ultrathin Gold Nanowires, Phys. Chem. Chem. Phys. 2016, 18, 27165-27169.

Loubat, A.; Imperor-Clerc, M.; Pansu, B.; Meneau, F.; Raquet, B.; Viau, G.; Lacroix, L. M., Growth and Self-Assembly of Ultrathin Au Nanowires into Expanded Hexagonal Super Lattice Studied by in Situ Saxs, Langmuir 2014, 30, 4005-4012.

Chocholousova, J.; Vacek, J.; Hobza, P., Acetic Acid Dimer in the Gas Phase, Nonpolar Solvent, Microhydrated Environment, and Dilute and Concentrated Acetic Acid: Ab Initio Quantum Chemical and Molecular Dynamics Simulations, J. Phys. Chem. A 2003, 107, 3086-3092.

\* cited by examiner

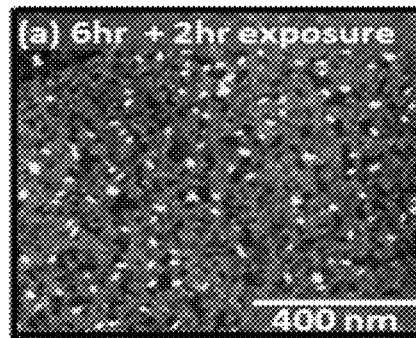 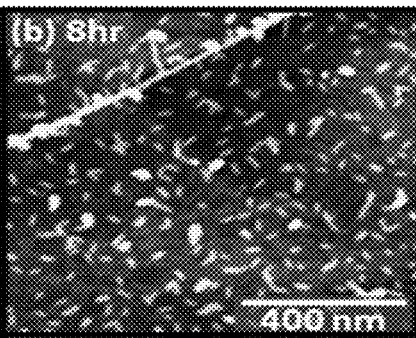 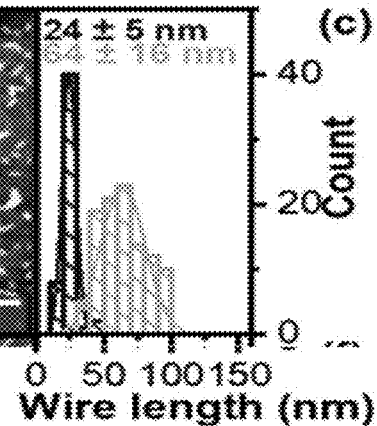
Fig. 6A　　　　Fig. 6B　　　　Fig. 6C
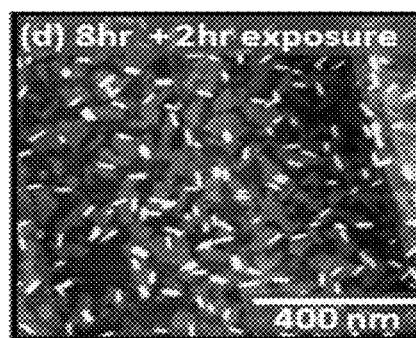 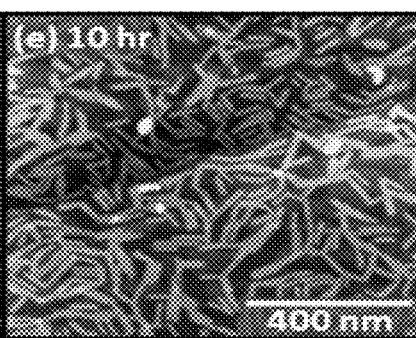 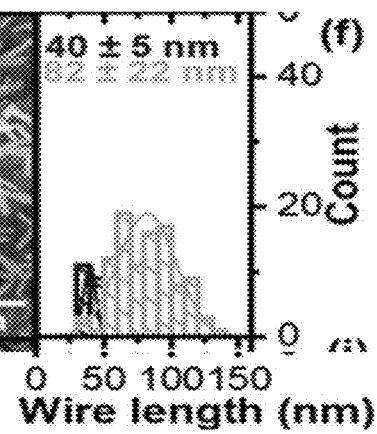
Fig. 6D　　　　Fig. 6E　　　　Fig. 6F

CONTROLLED GROWTH OF ULTRANARROW NANOWIRES ON FUNCTIONALIZED 2D MATERIALS

CROSS REFERENCE TO RELATED APPLICATIONS

This present patent application relates to and claims the priority benefit of U.S. Provisional Application Ser. No. 62/636,200, filed Feb. 28, 2018, the content of which is hereby incorporated herein by reference in its entirety.

GOVERNMENT SUPPORT CLAUSE

This invention was made with government support under grant N66001-17-1-4046 awarded by the Defense Advanced Research Projects Agency (DARPA). The government has certain rights in the invention.

TECHNICAL FIELD

This invention generally relates to a method for growing ultra-narrow nanowires or nanorods on a functionalized supporting 2D material substrate, more specifically to a method for growing ultra-narrow nanowires or nanorods on a non-covalently functionalized supporting 2D material substrate using a polymerizable lipid amphiphile.

BACKGROUND

This section introduces aspects that may help facilitate a better understanding of the disclosure. Accordingly, these statements are to be read in this light and are not to be understood as admissions about what is or is not prior art.

Integrating graphene with into functional hybrids materials and devices increasingly requires the capability to structure and template interactions with the environment across a range of length scales (Mann, J. A., et al., *J. Phys. Chem. Lett* 2013, 4, 2649-2657; MacLeod, J. M., et al., *Small* 2014, 10, 1038-1049; Bang, J. J., et al., *J. Am. Chem. Soc.* 2016, 138, 4448-4457). Noncovalent ligand chemistries are frequently desirable in functionalizing 2D materials because they do not disrupt electronic conjugation within the basal plane; however, this raises the challenge of stabilizing the monolayer toward solvents exposure and other common processing conditions.

Noncovalent monolayer chemistries are widely used in controlling surface chemistry of layered materials. Integrating functionalized 2D materials into multilayer device architectures suggests the need for functionalization strategies that are not only robust toward solution or vacuum processing, but also enables spatially controlled interactions with other materials in a hybrid. Synergistic with this need, lying down phases of functional alkanes commonly used in noncovalent functionalization present 1-nm-wide rows of paired functional headgroups separated by ~5 nm stripes of exposed alkane chains.

Most recently much research is being dedicated to study nanoscale objects, and attempts have been made to build nanoscale objects in a controlled manner (Stasiak, et al, U.S. Pat. No. 7,597,814, 2009; Kamins, U.S. Pat. No. 7,446,024, 2008). Nanowires have potential uses in nanoelectronic, nanophotonic, and sensing devices. For many applications, the diameter of the nanowire must be controlled. There is a clear need for new technologies that will fabricate nanowires or nano rods in a controlled manner at micro and nano scales.

BRIEF SUMMARY OF INVENTIONS

This invention generally relates to a method for growing ultra-narrow nanowires on a functionalized 2D material substrate. Functionalization of the substrate employs a polymerizable lipid amphiphile.

In some illustrative embodiments, this invention relates to a method for preparing an ultra-narrow nanowire or nanorod on a non-covalently functionalized supporting 2D material substrate comprising the steps of
  a. preparing a supporting 2D material substrate;
  b. functionalizing said supporting 2D material substrate by preparing a monolayer or thin film comprising the step of assembling a polymerizable amphiphile comprising both hydrophobic and hydrophilic constituents on said supporting 2D material substrate, and then polymerizing said amphiphile to afford said monolayer or thin film;
  c. preparing a salt solution or suspension; and
  d. growing an ultra-narrow nanowire or nanorod by exposing the salt solution or suspension to said monolayer or thin film on said supporting 2D material substrate.

In some illustrative embodiments, this invention relates to a method for preparing an ultra-narrow nanowire or nanorod on a non-covalently functionalized supporting 2D material substrate as disclosed herein, wherein said salt solution or suspension comprises a nonpolar solvent or a mixture thereof.

In some illustrative embodiments, this invention relates to a method for preparing an ultra-narrow nanowire or nanorod on a non-covalently functionalized supporting 2D material substrate as disclosed herein, wherein said salt solution or suspension comprises hexane or cyclohexane or a mixture thereof.

In some illustrative embodiments, this invention relates to a method for preparing an ultra-narrow nanowire or nanorod on a non-covalently functionalized supporting 2D material substrate as disclosed herein, wherein said salt is a gold or silver salt.

In some illustrative embodiments, this invention relates to a method for preparing an ultra-narrow nanowire or nanorod on a non-covalently functionalized supporting 2D material substrate as disclosed herein, wherein said salt solution or suspension comprises a cyclohexane solvent mixed with a fatty amine, triisopropylsilane and a gold salt.

In some illustrative embodiments, this invention relates to a method for preparing an ultra-narrow nanowire or nanorod on a non-covalently functionalized supporting 2D material substrate as disclosed herein, wherein said salt solution or suspension comprises a cyclohexane solvent mixed with oleylamine, triisopropylsilane and a gold salt.

In some illustrative embodiments, this invention relates to a method for preparing an ultra-narrow nanowire or nanorod on a non-covalently functionalized supporting 2D material substrate as disclosed herein, wherein said gold salt is $HAuCl_4 \cdot 3H_2O$.

In some illustrative embodiments, this invention relates to a method for preparing an ultra-narrow nanowire or nanorod on a non-covalently functionalized supporting 2D material substrate as disclosed herein, wherein said cyclohexane solution comprises about 1-1000 mM of oleylamine.

In some illustrative embodiments, this invention relates to a method for preparing an ultra-narrow nanowire or nanorod on a non-covalently functionalized supporting 2D material substrate as disclosed herein, wherein said cyclohexane solution or suspension comprises about 10-1000 mM of triisopropylsilane.

In some illustrative embodiments, this invention relates to a method for preparing an ultra-narrow nanowire or nanorod on a non-covalently functionalized supporting 2D material substrate as disclosed herein, wherein said cyclohexane solution or suspension comprises about 0.1-10 mM of a gold salt.

In some illustrative embodiments, this invention relates to a method for preparing an ultra-narrow nanowire or nanorod on a non-covalently functionalized supporting 2D material substrate as disclosed herein, wherein said cyclohexane solution or suspension comprises about 0.1-10 mM of $HAuCl_4.3H_2O$.

In some illustrative embodiments, this invention relates to a method for preparing an ultra-narrow nanowire or nanorod on a non-covalently functionalized supporting 2D material substrate as disclosed herein, wherein said polymerization of an amphiphile monolayer or thin film is performed by irradiating with an UV light.

In some illustrative embodiments, this invention relates to a method for preparing an ultra-narrow nanowire or nanorod on a non-covalently functionalized supporting 2D material substrate as disclosed herein, wherein said supporting 2D material substrate is graphene, highly oriented pyrolytic graphite (HOPG), or a layered material of $MoS_2$ or $WS_2$.

In some illustrative embodiments, this invention relates to a method for preparing an ultra-narrow nanowire or nanorod on a non-covalently functionalized supporting 2D material substrate as disclosed herein, wherein said polymerizable amphiphile is a lipid.

In some illustrative embodiments, this invention relates to a method for preparing an ultra-narrow nanowire or nanorod on a non-covalently functionalized supporting 2D material substrate as disclosed herein, wherein said lipid is a polymerizable phospholipid.

In some illustrative embodiments, this invention relates to a method for preparing an ultra-narrow nanowire or nanorod on a non-covalently functionalized supporting 2D material substrate as disclosed herein, wherein said polymerizable amphiphile is a single-chain fatty amine or dual-chain phospholipid with a terminal amine.

In some illustrative embodiments, this invention relates to a method for preparing an ultra-narrow nanowire or nanorod on a non-covalently functionalized supporting 2D material substrate as disclosed herein, wherein said polymerizable single-chain amphiphile is 4,6-pentacosadiyneamine or 10,12-pentacosa-diynamine.

In some illustrative embodiments, this invention relates to a method for preparing an ultra-narrow nanowire or nanorod on a non-covalently functionalized supporting 2D material substrate as disclosed herein, wherein said dual-chain amphiphile is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or other like polymerizable amphiphile.

In some other illustrative embodiments, this invention relates to a method for preparing an ultra-narrow nanowire or nanorod on a non-covalently functionalized supporting 2D material substrate comprising the steps of
  a. preparing a supporting 2D material substrate;
  b. functionalizing said supporting 2D material substrate by preparing a monolayer or thin film on said supporting 2D material substrate comprising the step of assembling a polymerizable amphiphile comprising both hydrophobic and hydrophilic constituents on said supporting 2D material substrate, and then polymerizing said amphiphile to afford said monolayer or thin film;
  c. preparing a metal salt dissolved or dispersed in a nonpolar medium; and
  d. growing an ultra-narrow nanowire or nanorod by exposing the salt solution or suspension to said monolayer or thin film on said supporting 2D material substrate.

In some illustrative embodiments, this invention relates to a nanowire or nanorod prepared according to the methods disclosed herein.

In some illustrative embodiments, this invention relates to a nanowire or nanorod prepared according to a method comprising the steps of
  a. preparing a supporting 2D material substrate;
  b. functionalizing said supporting 2D material substrate by preparing a monolayer or thin film on said supporting 2D material substrate comprising the step of assembling a polymerizable amphiphile comprising both hydrophobic and hydrophilic constituents on said supporting 2D material substrate, and then polymerizing said amphiphile to afford said monolayer or thin film;
  c. preparing a metal salt dissolved or dispersed in a nonpolar medium; and
  d. growing an ultra-narrow nanowire or nanorod by exposing the salt solution or suspension to said monolayer or thin film on said supporting 2D material substrate.

BRIEF DESCRIPTION OF THE DRAWINGS

Embodiments of the present disclosure will now be described by way of example in greater detail with reference to the attached Figures, in which:

FIG. 6A shows an AFM image of Au NWs grown on 4,6-PCD-NH2, by aging the growth solution for the stated period of 6 hours (hr) and then exposing the surface to the aged growth solution for 2 hr.

FIG. 6B shows an AFM image of Au NWs grown on 4,6-PCD-NH2, by continuously exposing the surface to growth solution for the entire time period of 8 hr.

FIG. 6C shows the histograms illustrating the distribution of wire lengths observed with 6 hr aging plus 2 hr exposure (blue) in comparison with continuous exposure for 8 hr (gold bars).

FIG. 6D shows an AFM image of Au NWs grown on 4,6-PCD-NH2, by aging the growth solution for the stated period of 8 hr and then exposing the surface to the aged growth solution for 2 hr.

FIG. 6E shows an AFM image of Au NWs grown on 4,6-PCD-NH2, by continuously exposing the surface to growth solution for the entire time period of 10 hr.

FIG. 6F shows the histograms illustrating the distribution of wire lengths observed with 8 hr aging plus 2 hr exposure (blue) in comparison with continuous exposure for 10 hr (gold bars).

FIG. 7C shows line scans acquired from lines 1 and 2 highlighted in FIG. 7A, illustrating center-to-center distances observed for wire growth on 4,6-PCD-NH2.

DETAILED DESCRIPTION

Figure 1A:
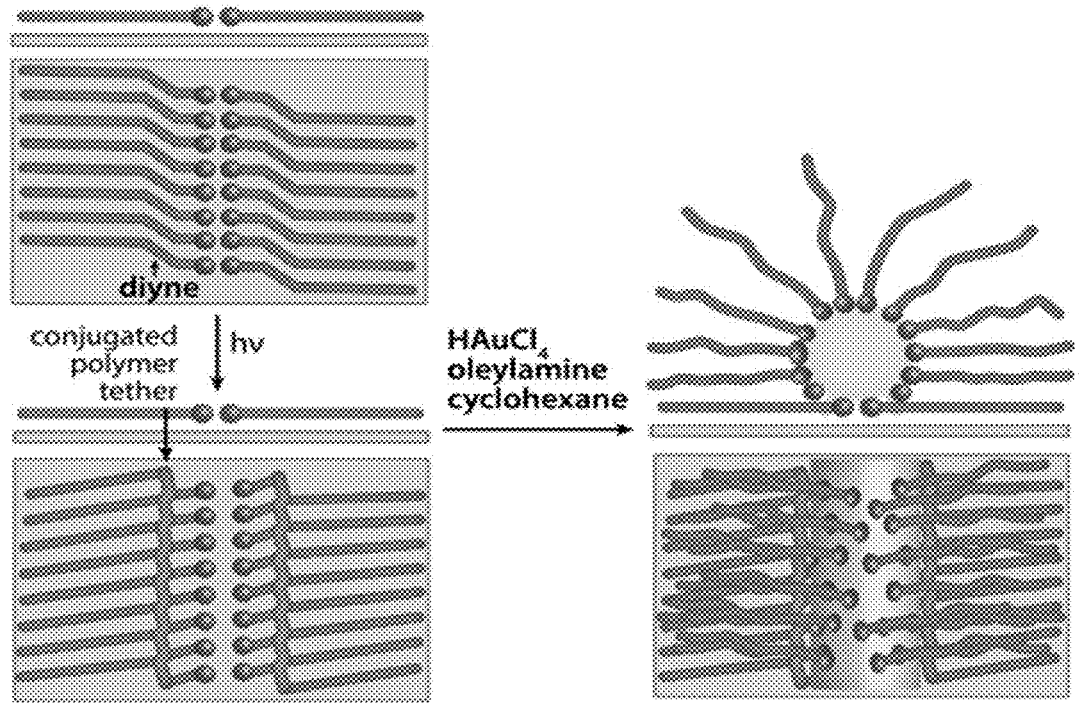
FIG. 1A illustrates noncovalent functionalization of a 2D material basal plane using a functional alkane with an internal diyne, photopolymerization by UV irradiation to yield a conjugated ene-yne, and the growth of gold nanowires on the rows of functional headgroups.
Figure 1B:
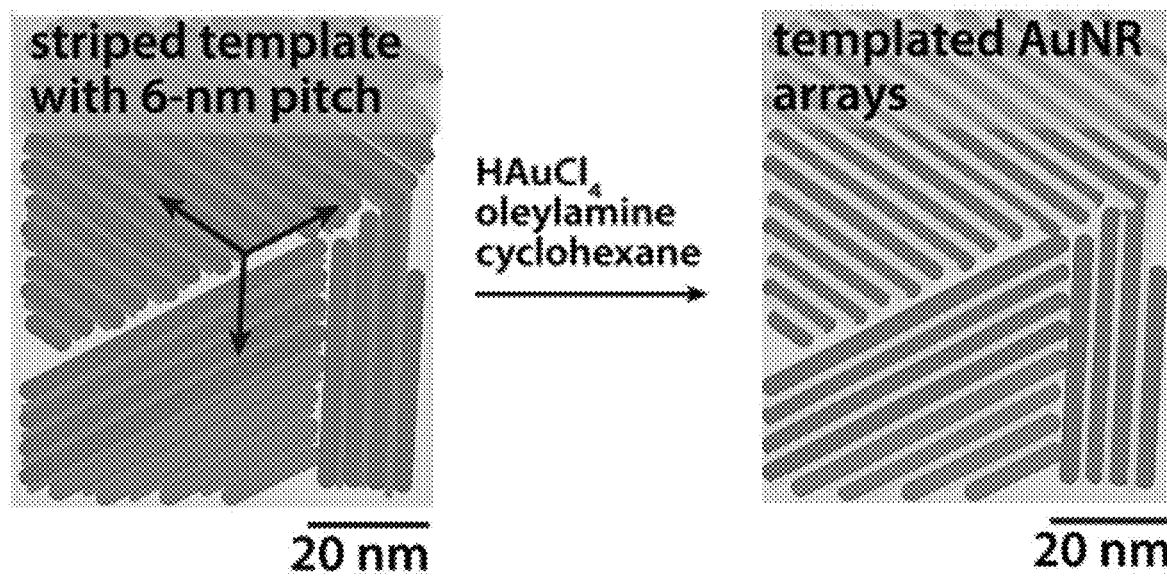
FIG. 1B shows a striped template with 6-nm pitch and the gold nanoroad arrays grew on the striped template.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

In the present disclosure the term "substantial" or "substantially" can allow for a degree of variability in a value or range, for example, within 80%, within 90%, within 95%, or within 99% of a stated value or of a stated limit of a range.

As used herein, an "amphiphile" is defined as a chemical compound comprising both hydrophilic and hydrophobic constituents.

As used herein, a "thin film" is defined as a layer of material ranging from less than 1 nm to several thousand nanometers in thickness.

As disclosed herein, a suspension is a heterogeneous mixture that contains solid or liquid particles sufficiently large for sedimentation. The particles may be visible to the naked eye, usually must be larger than 1 micrometer, and will eventually settle. A suspension is a heterogeneous mixture in which the solute particles do not dissolve, but get suspended throughout the bulk of the solvent, left floating around freely in the medium. The internal phase (solid or liquid) is dispersed throughout the external phase (fluid) through mechanical agitation, with the use of certain excipients or suspending agents. An example of a suspension would be sand in water or oil in water. The suspended particles are visible under a microscope and will settle over time if left undisturbed. A suspension is different from a solution, in which the dissolved substance (solute), and solvent and solute are homogeneously mixed.

A layered, or two-dimensional (2D) material generally has a layer thickness between one atomic layer and a few nm. Even though the existence of two-dimensional materials have been theorized since the 1940's (Wallace, P. R. *Phys. Rev.* 1947, 71, 622-634), it was not until 2004 that it was shown that these materials can be stable as freestanding sheets, by the isolation of individual graphene sheets (Novoselov, K. S. et al., *Science* 2004, 306, 666-669). Layers may be stacked to form macroscopic materials; for instance, highly oriented pyrolytic graphite (HOPG) consists of stacks of graphene layers.

This invention generally relates to a method for growing ultra-narrow nanowires on a functionalized 2D material substrate. Functionalization of the substrate employs a polymerizable lipid amphiphile.

In some aspects, this invention relates to a method for preparing an ultra-narrow nanowire or nanorod on a non-covalently functionalized supporting 2D material substrate comprising the steps of
  a. preparing a supporting 2D material substrate;
  b. functionalizing said supporting 2D material substrate by preparing a monolayer or thin film comprising the step of assembling a polymerizable amphiphile comprising both hydrophobic and hydrophilic constituents on said supporting 2D material substrate, and then polymerizing said amphiphile to afford said monolayer or thin film;
  c. preparing a salt solution or suspension; and
  d. growing an ultra-narrow nanowire or nanorod by exposing the salt solution or suspension to said monolayer or thin film on said supporting 2D material substrate.

In some aspects, this invention relates to a method for preparing an ultra-narrow nanowire or nanorod on a non-covalently functionalized supporting 2D material substrate as disclosed herein, wherein said salt solution or suspension comprises a nonpolar solvent or a mixture thereof.

In some aspects, this invention relates to a method for preparing an ultra-narrow nanowire or nanorod on a non-covalently functionalized supporting 2D material substrate as disclosed herein, wherein said salt solution or suspension comprises hexane or cyclohexane or a mixture thereof.

In some aspects, this invention relates to a method for preparing an ultra-narrow nanowire or nanorod on a non-covalently functionalized supporting 2D material substrate as disclosed herein, wherein said salt is a metal salt.

In some aspects, this invention relates to a method for preparing an ultra-narrow nanowire or nanorod on a non-covalently functionalized supporting 2D material substrate as disclosed herein, wherein said metal salt is a gold or silver salt.

In some aspects, this invention relates to a method for preparing an ultra-narrow nanowire or nanorod on a non-covalently functionalized supporting 2D material substrate as disclosed herein, wherein said salt solution or suspension comprises a cyclohexane solvent mixed with a fatty amine, triisopropylsilane and a gold salt.

In some aspects, this invention relates to a method for preparing an ultra-narrow nanowire or nanorod on a non-covalently functionalized supporting 2D material substrate as disclosed herein, wherein said salt solution or suspension comprises a cyclohexane solvent mixed with oleylamine, triisopropylsilane and a gold salt.

In some aspects, this invention relates to a method for preparing an ultra-narrow nanowire or nanorod on a non-covalently functionalized supporting 2D material substrate as disclosed herein, wherein said gold salt is $HAuCl_4 \cdot 3H_2O$.

In some aspects, this invention relates to a method for preparing an ultra-narrow nanowire or nanorod on a non-covalently functionalized supporting 2D material substrate as disclosed herein, wherein said cyclohexane solution comprises about 1-1000 mM of oleylamine.

In some aspects, this invention relates to a method for preparing an ultra-narrow nanowire or nanorod on a non-covalently functionalized supporting 2D material substrate as disclosed herein, wherein said cyclohexane solution or suspension comprises about 10-1000 mM of triisopropylsilane.

In some aspects, this invention relates to a method for preparing an ultra-narrow nanowire or nanorod on a non-covalently functionalized supporting 2D material substrate as disclosed herein, wherein said cyclohexane solution or suspension comprises about 0.1-10 mM of a gold salt.

In some aspects, this invention relates to a method for preparing an ultra-narrow nanowire or nanorod on a non-covalently functionalized supporting 2D material substrate as disclosed herein, wherein said cyclohexane solution or suspension comprises about 0.1-10 mM of $HAuCl_4 \cdot 3H_2O$.

In some aspects, this invention relates to a method for preparing an ultra-narrow nanowire or nanorod on a non-covalently functionalized supporting 2D material substrate as disclosed herein, wherein said polymerization of an amphiphile monolayer or thin film is performed by irradiating with an UV light.

In some aspects, this invention relates to a method for preparing an ultra-narrow nanowire or nanorod on a non-covalently functionalized supporting 2D material substrate as disclosed herein, wherein said supporting 2D material substrate is graphene, highly oriented pyrolytic graphite (HOPG), or a layered material of $MoS_2$ or $WS_2$.

In some aspects, this invention relates to a method for preparing an ultra-narrow nanowire or nanorod on a non-covalently functionalized supporting 2D material substrate as disclosed herein, wherein said polymerizable amphiphile is a lipid.

In some aspects, this invention relates to a method for preparing an ultra-narrow nanowire or nanorod on a non-covalently functionalized supporting 2D material substrate as disclosed herein, wherein said lipid is a polymerizable phospholipid.

In some aspects, this invention relates to a method for preparing an ultra-narrow nanowire or nanorod on a noncovalently functionalized supporting 2D material substrate as disclosed herein, wherein said polymerizable amphiphile is a single-chain fatty amine or dual-chain phospholipid with a terminal amine.

In some aspects, this invention relates to a method for preparing an ultra-narrow nanowire or nanorod on a noncovalently functionalized supporting 2D material substrate as disclosed herein, wherein said polymerizable single-chain amphiphile is 4,6-pentacosadiyneamine or 10,12-pentacosadiynamine.

In some aspects, this invention relates to a method for preparing an ultra-narrow nanowire or nanorod on a noncovalently functionalized supporting 2D material substrate as disclosed herein, wherein said dual-chain amphiphile is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or other like polymerizable amphiphile.

In some aspects, this invention relates to a method for preparing an ultra-narrow nanowire or nanorod on a noncovalently functionalized supporting 2D material substrate comprising the steps of
  a. preparing a supporting 2D material substrate;
  b. functionalizing said supporting 2D material substrate by preparing a monolayer or thin film on said supporting 2D material substrate comprising the step of assembling a polymerizable amphiphile comprising both hydrophobic and hydrophilic constituents on said supporting 2D material substrate, and then polymerizing said amphiphile to afford said monolayer or thin film;
  c. preparing a metal salt dissolved or dispersed in a nonpolar medium; and
  d. growing an ultra-narrow nanowire or nanorod by exposing the salt solution or suspension to said monolayer or thin film on said supporting 2D material substrate.

In some aspects, this invention relates to a nanowire or nanorod prepared according to the methods disclosed herein.

In some aspects, this invention relates to a nanowire or nanorod prepared according to a comprising the steps of
  a. preparing a supporting 2D material substrate;
  b. functionalizing said supporting 2D material substrate by preparing a monolayer or thin film on said supporting 2D material substrate comprising the step of assembling a polymerizable amphiphile comprising both hydrophobic and hydrophilic constituents on said supporting 2D material substrate, and then polymerizing said amphiphile to afford said monolayer or thin film;
  c. preparing a metal salt dissolved or dispersed in a nonpolar medium; and
  d. growing an ultra-narrow nanowire or nanorod by exposing the salt solution or suspension to said monolayer or thin film on said supporting 2D material substrate.

Integrating graphene with into functional hybrids materials and devices increasingly requires the capability to structure and template interactions with the environment across a range of length scales. Noncovalent ligand chemistries are frequently desirable in functionalizing 2D materials because they do not disrupt electronic conjugation within the basal plane; however, this raises the challenge of stabilizing the monolayer toward solvents exposure and other common processing conditions (Mann, J. A., et al., *J. Phys. Chem. Lett* 2013, 4, 2649-2657; MacLeod, J. M., et al., *Small* 2014, 10, 1038-1049; Bang, J. J., et al., *J. Am. Chem. Soc.* 2016, 138, 4448-4457).

Amphiphiles with polymerizable internal diynes are especially promising in this regard. Long-chain diynes including 10,12-pentacosadiynoic acid (10,12-PCDA) assemble into ordered lying-down lamellar phases on HOPG and graphene when deposited either from organic solvents (e.g. $CHCl_3$) or via Langmuir-Schaefer transfer of molecules from a standing phase monolayer on water (Okawa, Y. et al., *J. Chem. Phys.* 2001, 115, 2317-2322; Grim, P. C. M., et al., *Angew. Chem. Int. Ed.* 1997, 36, 2601-2603; Okawa, Y. et al., *Nanoscale* 2012, 4, 3013-3028). In the lying-down phases, the alkyl chains orient along the <1120> axis of the graphitic basal plane, and headgroups pair along the lamellar center, forming carboxylic acid dimers in the case of 10,12-PCDA. Photopolymerization of the internal diyne using UV radiation then produces an ene-yne polymer backbone, which has been studied extensively in the context of molecular electronics (Grim, P. C. M. et al., 1997), but can also serve to stabilize the monolayer against solvent removal or exchange (Bang, J. J. et al. 2016). Similar assembly and photopolymerization can also be carried out with diynes having other classes of functional headgroups (e.g. 10,12-pentacosadiynamine, N-aminopropyl-10,12-tricosadiyn-amide)) (Jiang, H., et al., *Chem. Eur. J.* 2014, 20, 16747-16752).

In such monolayers, the rows of headgroups represent 1-nm wide functional patterns with a pitch that can be precisely tuned based on chain length (typical values 5-6 nm); pattern lengths can range up to multiple μm, depending on how the monolayer is assembled (Hayes, T. R. et al., *ACS Appl. Mater. Interf.* 2017, 9, 36409-36416). Recent work in our group has indicated that the steric availability of the headgroup, as well as other physical properties (e.g. tailgroup hydrophobicity) can be tuned based on ligand architecture. Positioning the diyne near the functional head appears to disrupt headgroup ordering during polymerization, potentially making the headgroups more accessible as ligands. Similarly, horizontally-oriented striped phases of diynoic phospholipids (e.g. 23:2 10,12-diyne phosphoethanolamine, diyne PE) adopt a 'sitting' orientation in which the terminal functional group protrudes slightly from the interface. Our previous experiments indicate this orientation has substantial impacts on interfacial wetting, and the obligate headgroup protrusion also suggests utility as a functional template (Bang, J. J., et al., 2016; Davis, T. C. et al., *Langmuir* 2018, 34, 1353-1362; Choong, S. W. et al., *ACS Appl. Mater. Interf.* 2017, 9, 19326-19334).

Here, we examine the relationship between headgroup structures in noncovalent ligand layers and templated growth of gold nanowires on 2D material surfaces. For the wire growth, we use a procedure previously shown to enable solution-phase growth of Au wires with precisely controlled diameters of ~2 nm, at higher precursor concentrations in solution. Here, we sought to compare the impacts of specific headgroup chemistries on nanowire growth. The three molecules we investigated as templates were: 4,6-pentacosadiynamine (4,6-PCD-$NH_2$), 10,12-pentacosa-diynamine (10,12-PCD-$NH_2$), and 1,2-bis(10,12-tricosadiynoyl)-sn-glycero-3-phosphoethanolamine (diyne PE). Comparing the templating effects of these monolayers enabled us to test for differences based on disordering of headgroups (4,6-PCD-$NH_2$ vs. 10,12-PCD-$NH_2$) and chain architecture (4,6-PCD-NH2 vs. diyne PE).

Synthesis of 10,12- and 4,6-pentacosadiynamine

The isomeric pentacosadiynamines were prepared from diynoic acids: 10,12-pentacosadiynoic acid (10,12-PCDA)

was procured commercially, while 4,6-PCDA was synthesized by coupling a terminal bromoalkyes to w-alkynyl amine under Cadiot-Chodkewicz (Cadiot, P. et al., In Chemistry of Acetylenes, Viehe, H. G., Ed. Marcel Dekker: New York, 1969; pp 597-647), cross-coupling conditions (Scheme 1). Synthetic protocols are described in more detail in the experimental section.

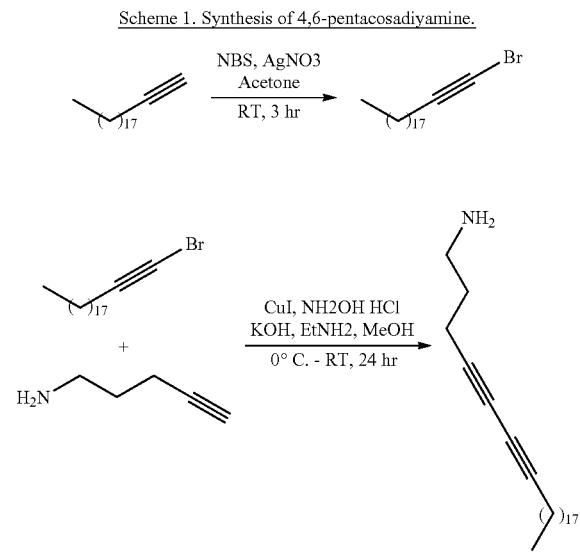

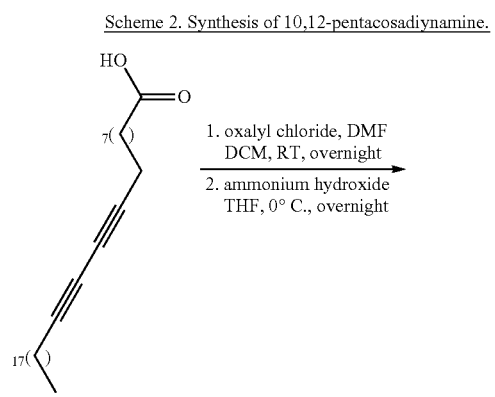

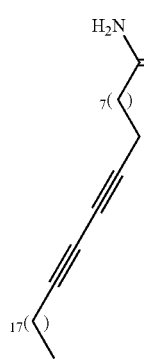

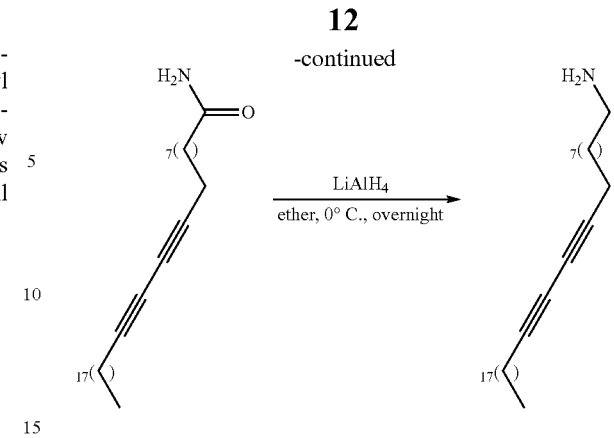

Preparation of Functional Templates on HOPG and Graphene.

Figure 2A:
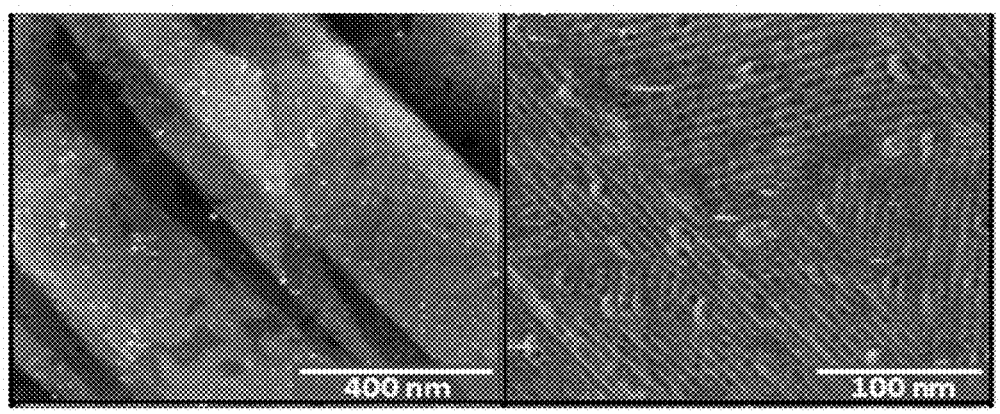
FIG. 2A depicts AFM images showing domain structure (left) and lamellar structure (right) of monolayers on HOPG assemble from 4,6-PCD-$NH_2$.
Figure 2B:
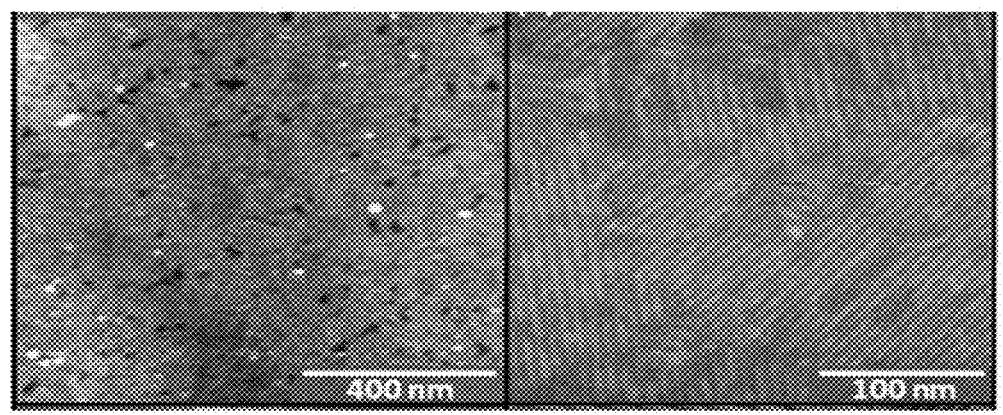
FIG. 2B depicts AFM images showing domain structure (left) and lamellar structure (right) of monolayers on HOPG assemble from 10,12-PCD-$NH_2$.
Figure 2C:
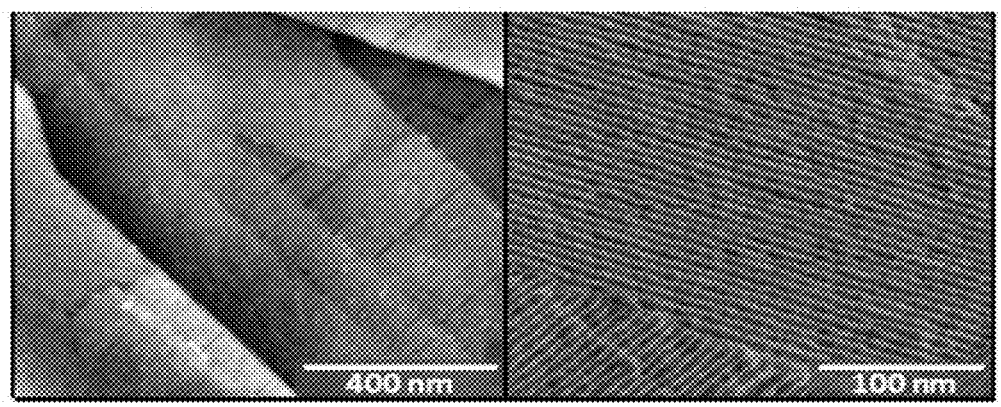
FIG. 2C depicts AFM images showing domain structure (left) and lamellar structure (right) of monolayers on HOPG assemble from diyne PE.

Monolayers were prepared via Langmuir-Schaefer (LS) conversion from monolayers on an aqueous subphase. Transfer procedures are described in more detail in the Experimental Methods section. Briefly, standing monolayers of each amphiphile were prepared on water, and an HOPG or graphene surface was lowered gently onto the top face of the monolayer (the exposed alkyl tails); after a brief equilibration time (typically 2 minutes), the solid substrate was slowly lifted from the monolayer surface. Previous work by our group and others has demonstrated that this protocol can be used to prepare lying-down domains of amphiphiles suitable for photopolymerization (Bang, J. J., et al., 2016; Davis, T. C. et al., Langmuir 2018, 34, 1353-1362; Choong, S. W. et al., ACS Appl. Mater. Interf. 2017, 9, 19326-19334; Okawa, Y., et al., J. Chem. Phys. 2001, 115, 2317-2322). Transferred monolayers were characterized by AFM. Typical AFM images are shown in FIGS. 2A-2C below. While all three template molecules produce high-coverage monolayers, domains of diyne PE are larger (edge lengths 500-1000 nm) than those of the single-chain amphiphiles 4,6-PCD-$NH_2$ and 10,12-PCD-$NH_2$ (typical edge lengths 100-200 nm), which might be expected to produce greater uniformity in nucleation and wire lengths in templated gold nanowire (Au NW).

Controlled Surface Templated Au NW Growth Via Variations in Precursor Concentrations.

Surface templated Au NW synthesis with oleylamine (OA) ligands was adapted from previously reported literature procedures for wire growth in solution (Huo, Z. Y., et al., Nano Lett. 2008, 8, 2041-2044; Reiser, B., et al, Phys. Chem. Chem. Phys. 2016, 18, 27165-27169; Loubat, A. et al., Langmuir 2014, 30, 4005-4012). In a typical reaction, $HAuCl_2$ was added to cyclohexane, followed by the addition of OA and triisopropylsilane (TIPS), which act as reducing agents. The mixture was vortexed until all $HAuCl_2$ was dissolved; substrates were then lowered into contact with the growth solution and maintained in contact with the solution for 12 hours. Initial reactant concentrations based on previous literature (labeled as Ox dilution below) are: 103 mM OM, 237 mM TIPS, and 2.62 mM $HAuCl_2$.

Figure 3A:
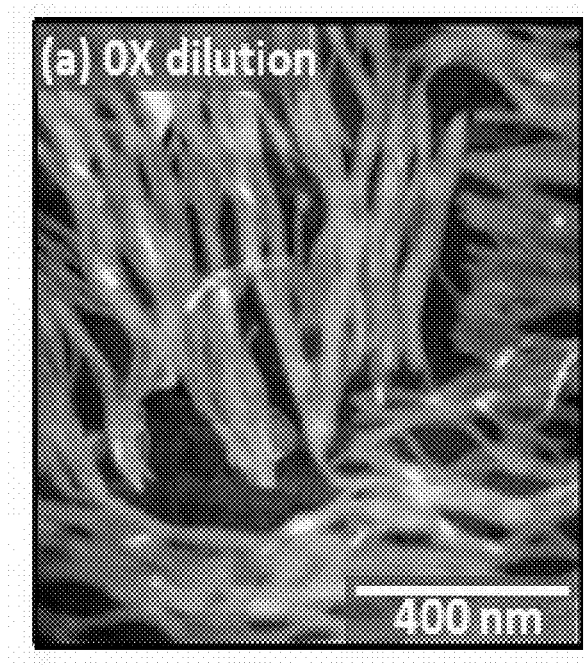
FIG. 3A shows an AFM topography image of Au NW growth on 4,6-PCD-$NH_2$ at concentrations used for solution-phase growth.
Figure 3B:
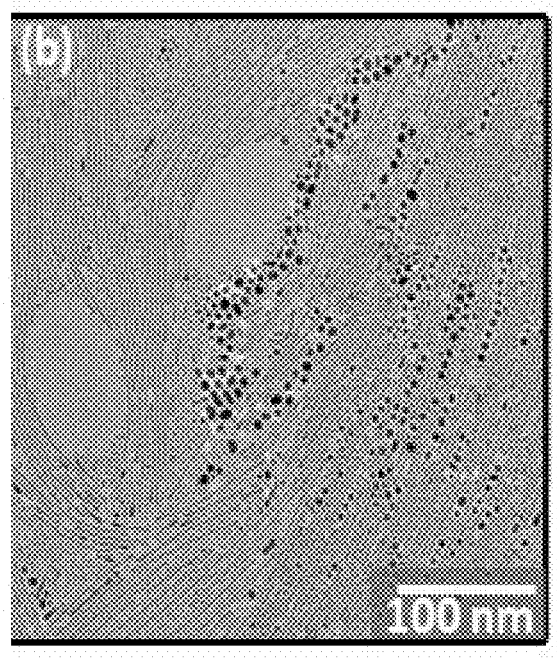
FIG. 3B shows a TEM image of particles in growth solution at point substrate in FIG. 3A was removed from contact with growth solution.

Growth of wires on 4,6-PCD-$NH_2$/HOPG templates using growth solution of cyclohexane with the reactant concentrations described above produced large bundles of wires (FIGS. 3A-3B). TEM images of the growth solution after 12 hrs and room temperature incubation (FIG. 3B), also reveal bundles of wires, consistent with literature reports of the solution growth process involving intercalated multilayers of OM ligands and n-hexane, producing hexagonally packed superlattices (Loubat, A. et al., 2014; Reiser, B. et al., 2016).

Because we were interested in producing surfaces with individual templated wires, we investigated reaction conditions that would minimize the occurrence of bundling on the surface. Previous reports have indicated that growth of wires in cyclohexane reduces bundling in comparison with growth in n-hexane, since the rigid "chair" structure of the cyclohexane ring does not easily intercalate with the OM ligand shell (Reiser, B. et al., 2016). Decreased bundling, however, reduces stability of the ligand shell during growth in solution, typically producing irregularly-shaped wires, as well as high percentages of spheres. We hypothesized that under these conditions, the surface template might stabilize the ligand shell, improving wire uniformity on the surface. Additionally, surfaces can act as heterogeneous nucleation sites for crystallization of materials, lowering energetic barriers to nucleation and enabling growth in the presence of lower concentration of reactants.

Therefore, with the goal of producing individual, well-defined wires with controlled diameters on the template, we tested growth solutions with a dilution range of 3×-10× in comparison with the reactant concentrations described above, with cyclohexane as a solvent. For instance, '3× dilution' growth solution represents: 32 mM OM, 72 mM TIPS, and 0.79 mM $HAuCl_2$ in cyclohexane. After placing substrates in contact with a growth solution for 12 hours, they were removed, washed, and imaged.

Figure 4A:
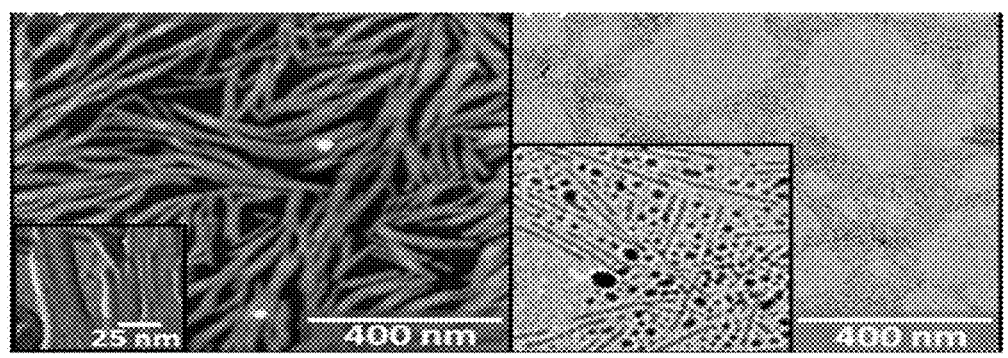
FIG. 4A shows an Atomic Force Microscopy (AFM, left) of Au NWs grown on 4,6-PCD-$NH_2$ at 3× dilution and an Transmission Electron Microscope (TEM, right) of particles recovered from growth solution at 3× dilution.

As reactant concentrations decrease, both the density of wires on the surface and average wire lengths decrease, while epitaxy with the monolayer increases (FIG. 4A). Wire density is quantified as the total length of wire present per $\mu m^2$ of template. At 3× dilution, calculated wire density is ~0.64 μm wire/m$^2$ template, decreasing to ~0.4 μm wire/μm$^2$ at 6× dilution, with minimal wire growth at 10× dilution.

Figure 4B:
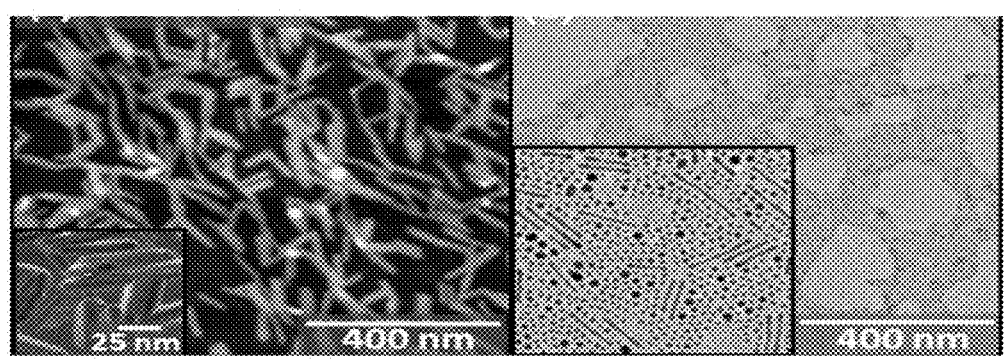
FIG. 4B shows an Atomic Force Microscopy (AFM, left) of Au NWs grown on 4,6-PCD-$NH_2$ at 5× dilution and an Transmission Electron Microscope (TEM, right) of particles recovered from growth solution at 5× dilution.
Figure 4C:
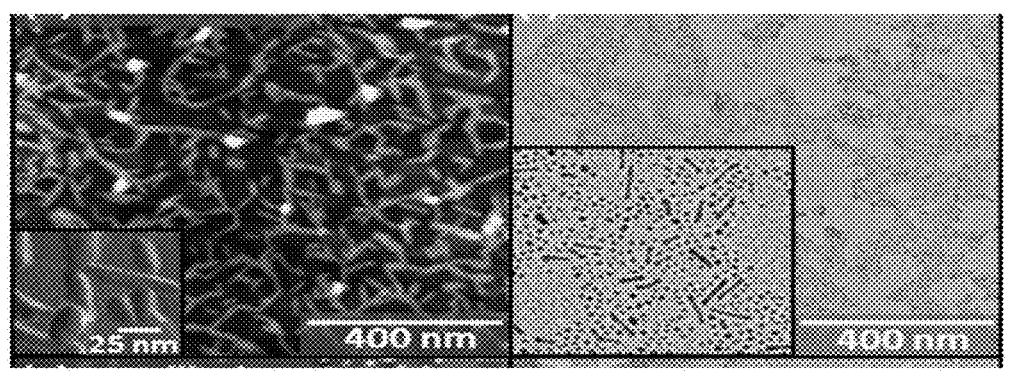
FIG. 4C shows an Atomic Force Microscopy (AFM, left) of Au NWs grown on 4,6-PCD-$NH_2$ at 7× dilution and an Transmission Electron Microscope (TEM, right) of particles recovered from growth solution at 7× dilution.
Figure 4D:
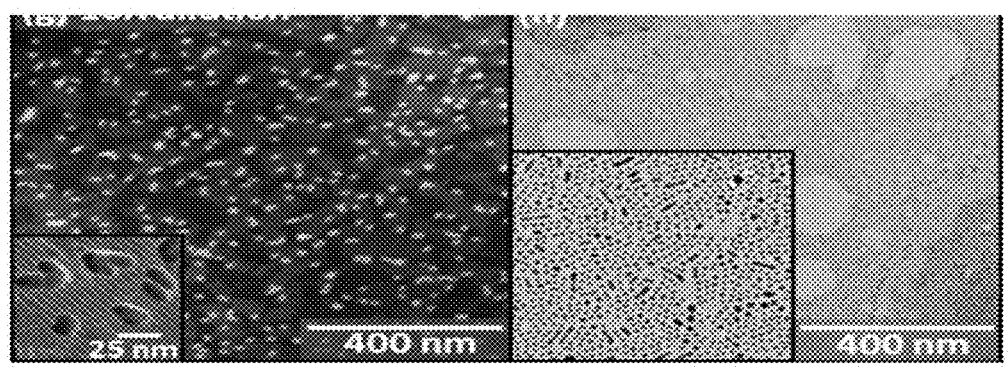
FIG. 4D shows an Atomic Force Microscopy (AFM, left) of Au NWs grown on 4,6-PCD-$NH_2$ at 10× dilution and an Transmission Electron Microscope (TEM, right) of particles recovered from growth solution at 10× dilution.
Figures 5A, 5B, 5C, 5D:
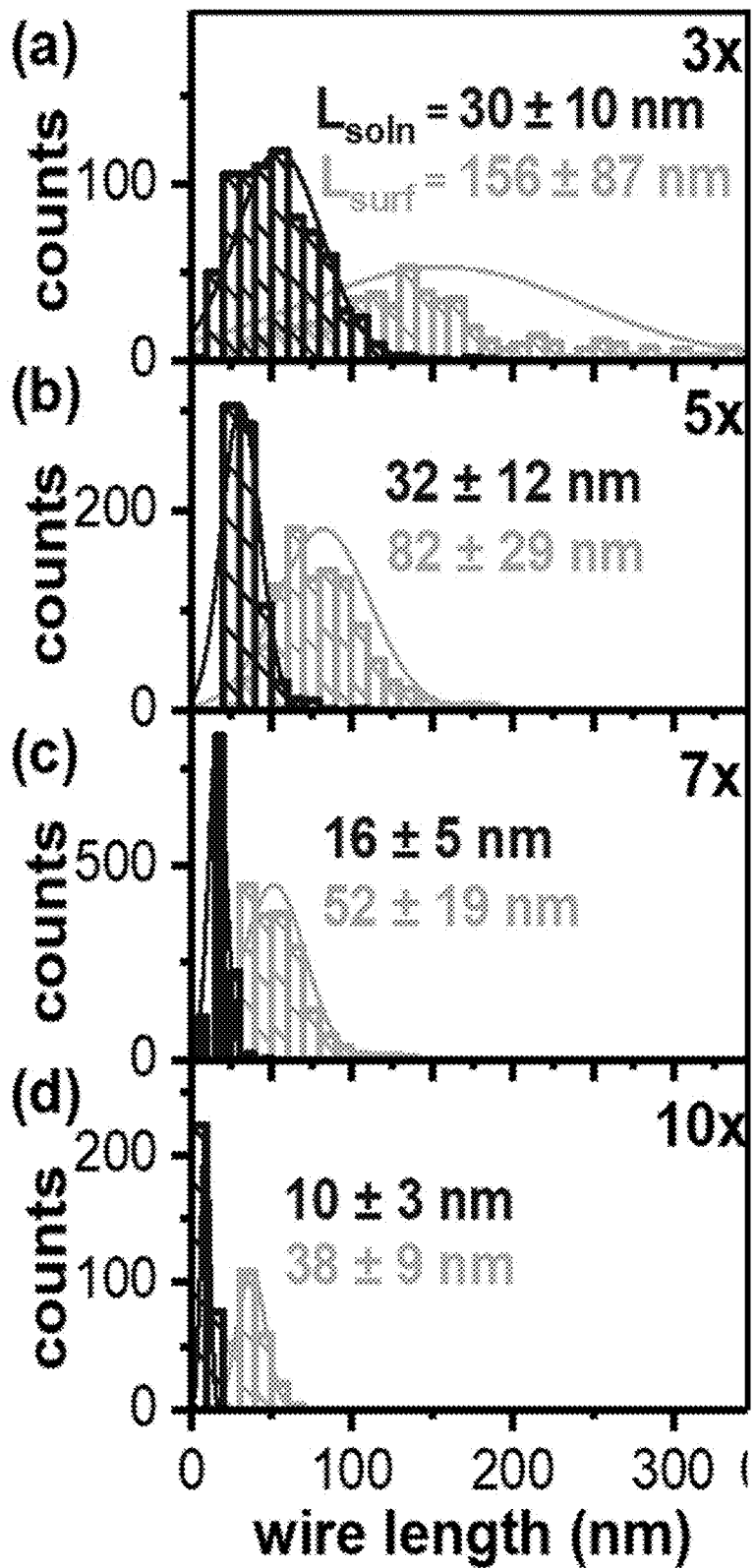
FIGS. 5A-5D show measured wire lengths of both solution phase wires (blue) and templated wires (yellow) under 3×, 5×, 7× and 10× dilutions, respectively.
Figures 5E, 5F, 5G, 5H:
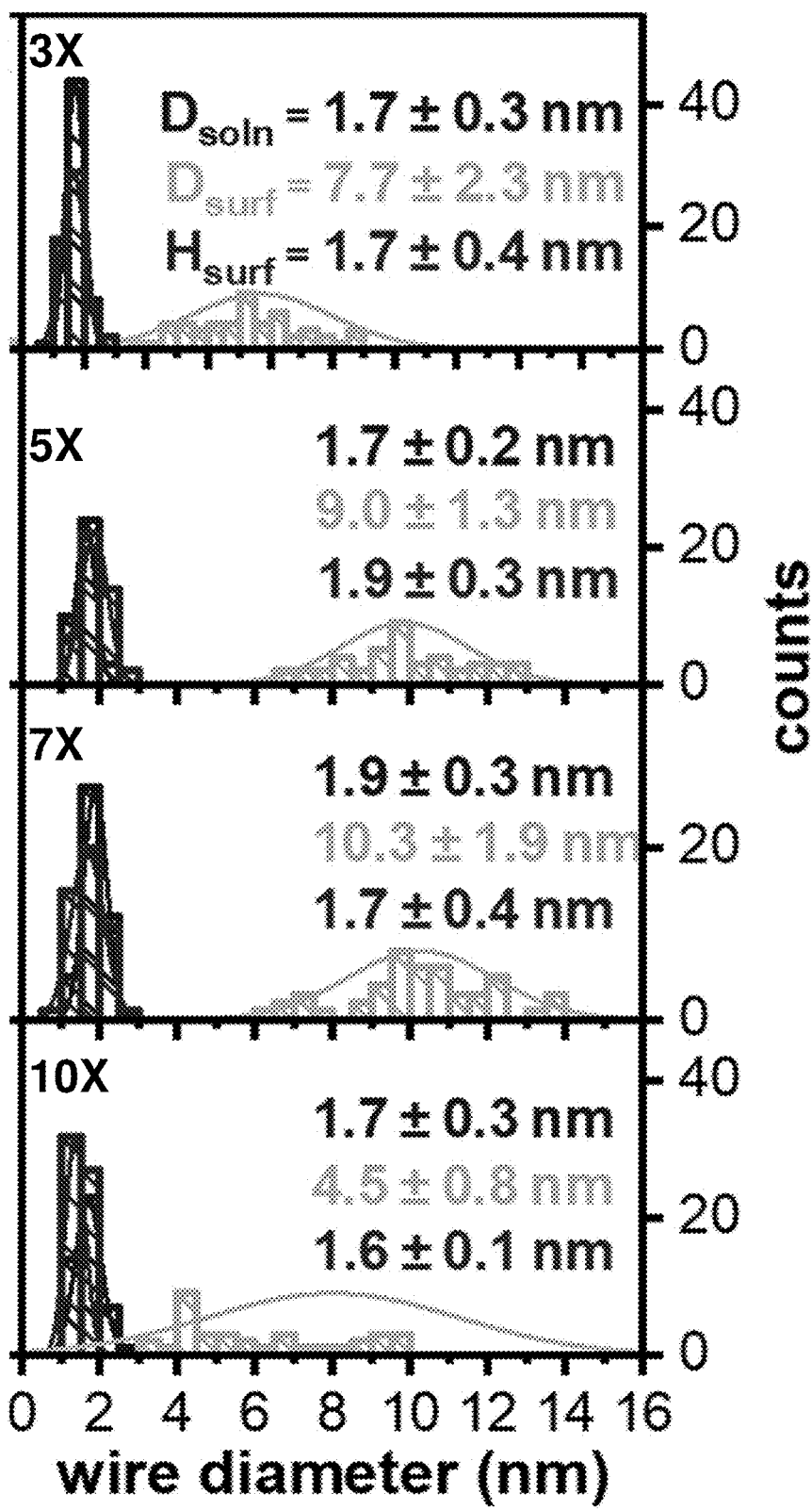
FIGS. 5E-5H show measured wire diameters from TEM (blue) and AFM (yellow) and wire heights measured by AFM (red) under 3×, 5×, 7× and 10× dilutions, respectively.

Wire lengths also decrease (FIG. 4B), although average surface-templated wire lengths are substantially greater than those in the growth solution. Average surface templated wire lengths decrease from of 117 nm±47 nm (at 3× dilution), to 82±29 nm (5×), and 52 nm±20 nm (7×), with minimal wire growth at 10× dilution. Conversely, the number density of wires (# wires/μm$^2$) initially increases with dilution ($N_{3x}$= 275/μm$^2$±135 vs. $N_{7x}$=584/μm$^2$±80), then decreases with further dilution ($N_{10x}$=31/μm$^2$) (standard deviation?) We postulate that initial dilution may result in formation of shorter micelles, producing larger values of N, while at even lower dilution, nucleation also begins to slow.

TEM images of particles present in the growth solution enable comparison of solution and surface-templated particle growth. Average wire diameters measured in TEM images were approximately 2 nm for all dilution factors tested here (FIGS. 5A-5H). Surface templated wires imaged by AFM appear to have somewhat larger diameters then those in TEM images. This difference is likely due in part to AFM tip convolution artifacts, as well as the fact that the imaged structure in AFM represents both AuNW and associated ligand shell on both sides of the wire. Average wire heights measured by AFM are 1.7±0.3 nm (red), similar to wire diameters measured by TEM (FIGS. 5A-5D). Applying standard, AFM tip broadening correction equations (see Experimental methods for details) to line scans across individual wires results in somewhat larger calculated wire diameters than those measured by TEM, with averages of 7.9-9.9 nm (FIGS. 5E-5H, yellow). We postulate that the difference between measured heights and diameters in AFM line scans is due to one or more layers of oleylamine capping ligands remaining on the wires after washing. Surface templated wire lengths decrease from 156±87 nm at 3× dilution to 38±9 nm at 10× dilution; at each dilution tested, average wire lengths on the template surface are 2.5-5× the wire lengths measured in the growth solution.

Nanowire Growth on 4,6-PCD-NH2 vs Time.

To examine how AuNW surface coverage and wire length vary with time, two different growth procedures were compared (FIGS. 6A-6L). In one, HOPG substrates functionalized with 4,6-PCD-NH$_2$ were brought into contact with freshly prepared growth solution and left in contact for 2-14 hours. At time periods less than 8 hours, minimal wire growth was observed. At timepoints from 8 to 14 hours, surface coverage and mean wire length increase (FIGS. 6B, 6C, 6E, 6F, 6H, 6I, 6K, and 6L), from 64±16 nm at 8 hours to 82±25 nm at 14 hours.

Because there was very limited wire growth in the first 6 hours of exposure to the growth solution, we also tested the effects of aging the growth solution and subsequently exposing it to template surfaces for 2 hours (FIGS. 6A, 6D, 6G and 6J). Overall, we found surface coverage to be somewhat less extensive in using this approach. At each time point tested, surfaces exposed for two hours at the end of the aging period exhibited shorter mean wire lengths (blue bars in FIG. 6 histograms) than surfaces exposed to the growth solutions throughout the entire time period (yellow bars in histograms), although for the 14 hr exposure and 12 hr aging/2 hr exposure time points, the distribution of wire lengths begins to become similar.

Figures 6G, 6H, 6I:
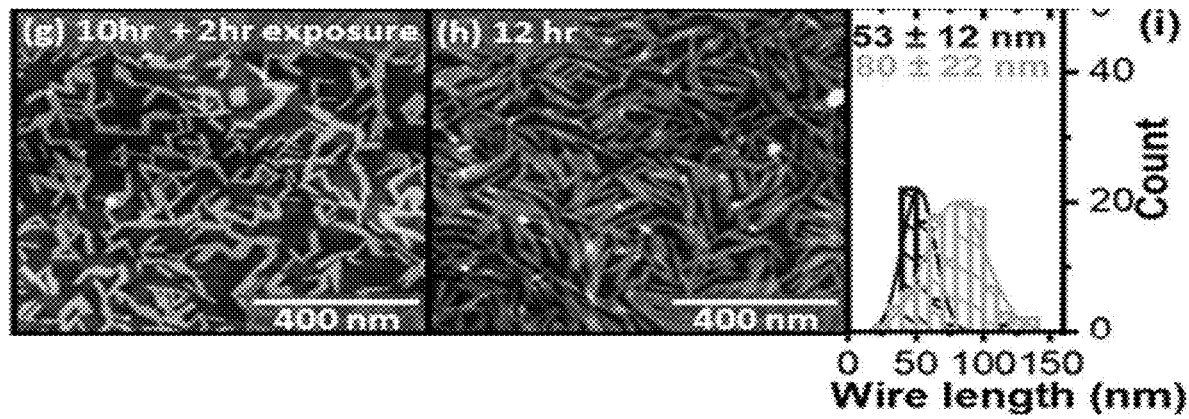
FIG. 6G shows an AFM image of Au NWs grown on 4,6-PCD-NH2, by aging the growth solution for the stated period of 10 hr and then exposing the surface to the aged growth solution for 2 hr.
FIG. 6H shows an AFM image of Au NWs grown on 4,6-PCD-NH2, by continuously exposing the surface to growth solution for the entire time period of 12 hr.
FIG. 6I shows the histograms illustrating the distribution of wire lengths observed with 10 hr aging plus 2 hr exposure (blue) in comparison with continuous exposure for 12 hr (gold bars).
Figures 6J, 6K, 6L:
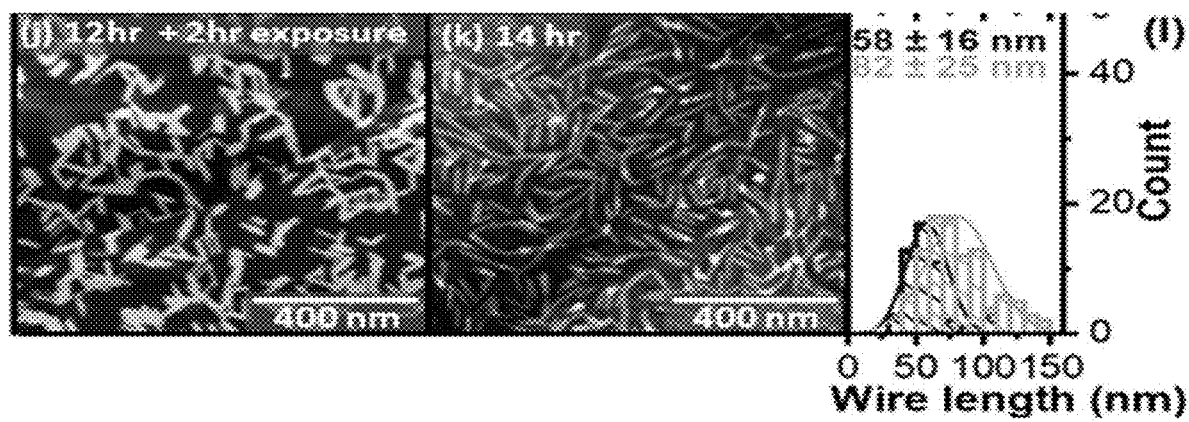
FIG. 6J shows an AFM image of Au NWs grown on 4,6-PCD-NH2, by aging the growth solution for the stated period of 12 hr and then exposing the surface to the aged growth solution for 2 hr.
FIG. 6K shows an AFM image of Au NWs grown on 4,6-PCD-NH2, by continuously exposing the surface to growth solution for the entire time period of 14 hr.
FIG. 6L shows the histograms illustrating the distribution of wire lengths observed with aging for 12 hr plus 2 hr exposure (blue) in comparison with continuous exposure (gold bars) for 14 hr.
Figures 7A, 7B, 76C:
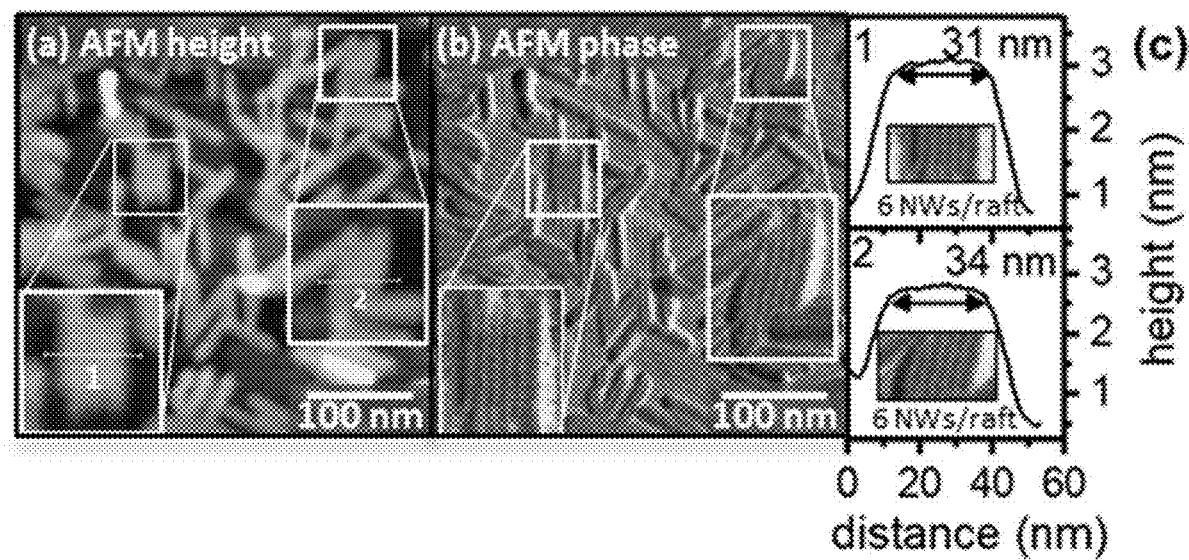
FIG. 7A shows AFM topography images of Au nanowires (NWs) grown on 4,6-PCD-NH2, illustrating periodic features in wire grouping.
FIG. 7B shows AFM phase images of Au NWs grown on 4,6-PCD-NH2, illustrating periodic features in wire grouping.

A further difference we observed in these experiments was that templates exposed to aged growth solution frequently exhibited patches of closely spaced wires (FIG. 6J) in comparison with the more even distributions of wires on templates exposed to the growth solution throughout the entire period (FIG. 6k). FIGS. 7A-7C show higher-resolution AFM topography and phase images of wires on 4,6-PCD-NH$_2$, from growth solution aged for 12 hours prior to surface exposure. Line scans reveal wire-wire distances of 7.2±1.7 nm, suggesting wires templated on adjacent rows of headgroups in the template, which is reasonable given an average wire diameter of 1.7 nm and an oleylamine molecular length of 2.2 nm.

Impact of Headgroup Structure on Au NW Growth.

We next examined the relationship between headgroup structure and the growth of nanowires on noncovalent templates, comparing templates assemble from 4,6-PCD-NH$_2$, 10,12-PCD-NH2, and diyne PE. While all three templates present rows of primary amines that can act to promote wire growth, differences in molecular architecture have the potential to modulate growth rates. First, lateral spacing between diyne PE headgroups (~0.9 nm) is approximately twice that of single chain amphiphiles (0.47 nm), reducing the local concentration of amine ligands in the template by a factor of 2. Steric availability of the amines is also an important structural consideration. Previously, we found that in wetting studies of polymerized lying-down monolayers of 4,6- and 10,12-pentacosadiynoic acids, monolayers of 4,6-pentacosadiynoic acids were more hydrophilic, suggesting greater availability of the carboxylic acid headgroups to the solvent. Molecular modeling suggested this difference arises due to disordering of the polar headgroups during polymerization, which reduces in-plane interactions within the monolayer, and increases steric availability of the functional groups. Hydrogen bond strength between amines is somewhat weaker than that for carboxylic acids, which can form strong H-bonded dimers (Chocholousova, J. et al., J. Phys. Chem. A 2003, 107, 3086-3092); thus, we expected that similar disordering might promote steric availability of the 4,6-PCD-NH$_2$ headgroups. Similarly, our studies of diyne phospholipids indicate that they assemble into monolayer structures in which the terminal functional group (here, the primary amine in the PE headgroup) protrude slightly from the surface (Bang, J. J., et al., 2016). The increased steric availability of the diyne PE amines could conceivably offset the reduced density of amines in the template.

Figures 8A, 8B:
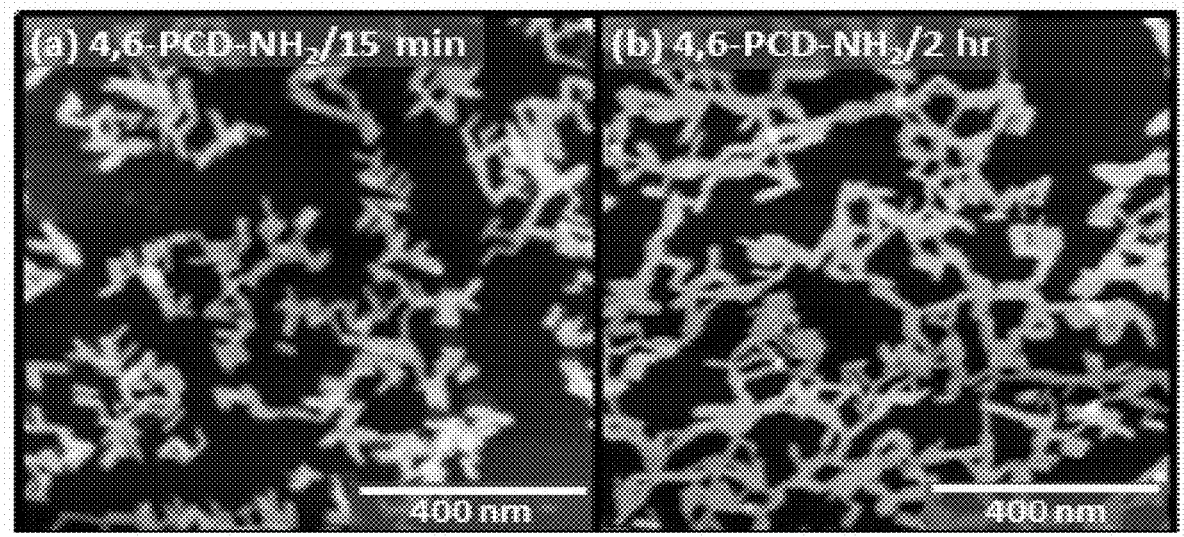
FIG. 8A shows AFM image of Au NWs grown using solution aged for 12 hr and then exposed for 15 min to HOPG functionalized with the stated surface chemistry of 4,6-PCD-$NH_2$.
FIG. 8B shows AFM image of Au NWs grown using solution aged for 12 hr and then exposed for 2 hr to HOPG functionalized with the stated surface chemistry of 4,6-PCD-$NH_2$.
Figures 8C, 8D:
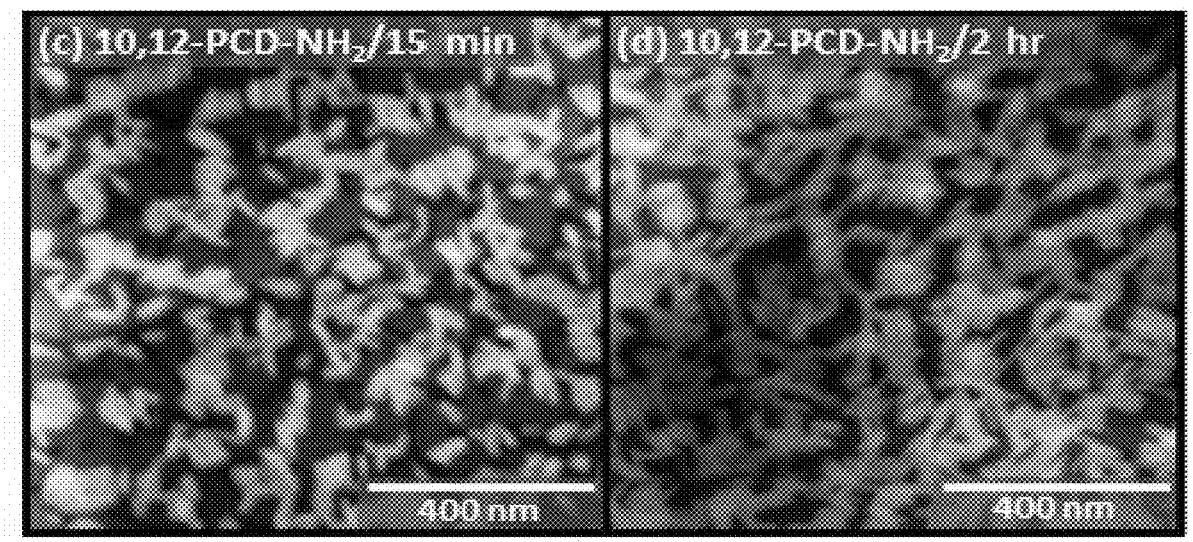
FIG. 8C shows AFM image of Au NWs grown using solution aged for 12 hr and then exposed for 15 min to HOPG functionalized with the stated surface chemistry of 10,12-PCD-$NH_2$.
FIG. 8D shows AFM image of Au NWs grown using solution aged for 12 hr and then exposed for 2 hr to HOPG functionalized with the stated surface chemistry of 10,12-PCD-$NH_2$.
Figures 8E, 8F:
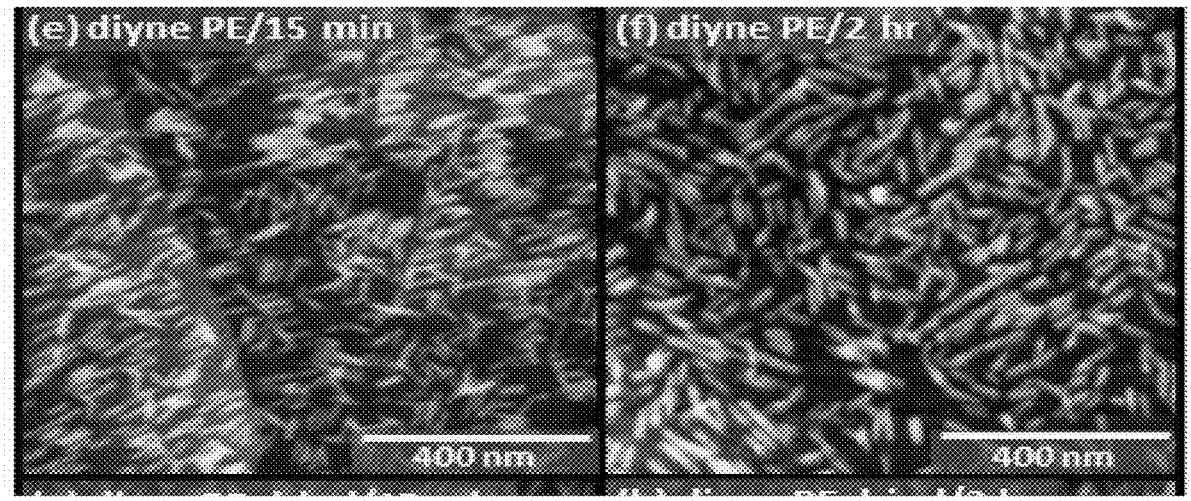
FIG. 8E shows AFM image of Au NWs grown in solution aged for 12 hr and then exposed for 15 min to HOPG functionalized with the stated surface chemistry of diyne PE.
FIG. 8F shows AFM image of Au NWs grown in solution aged for 12 hr and then exposed for 2 hr to HOPG functionalized with the stated surface chemistry of diyne PE.
Figures 8G, 8H:
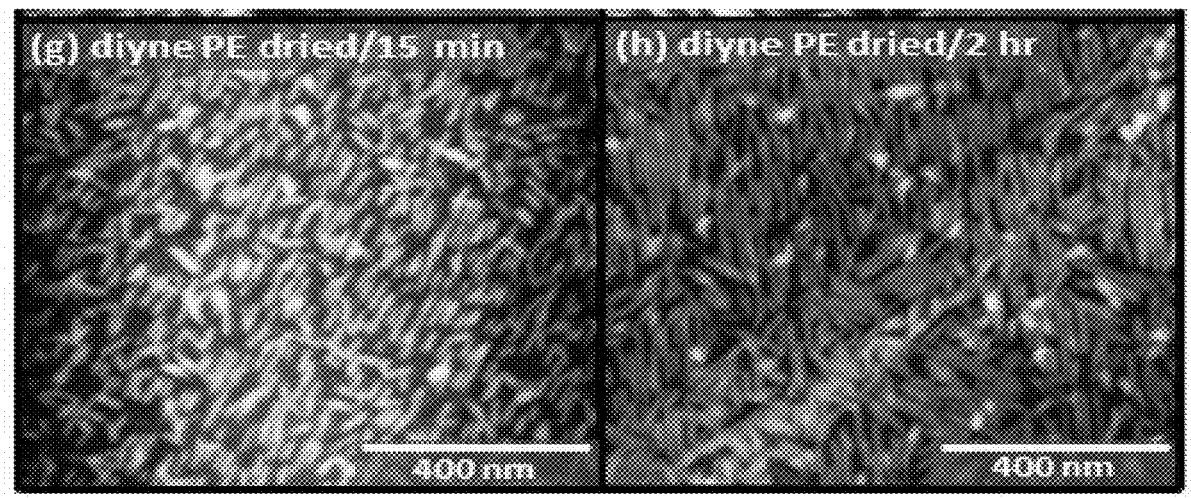
FIG. 8G shows AFM image of Au NWs grown using solution aged for 12 hr and then exposed for 15 min (a,c,e,g) to HOPG functionalized with the stated surface chemistry of diyne PE vacuum dried prior to exposure to reaction solution.
FIG. 8H shows AFM image of Au NWs grown using solution aged for 12 hr and then exposed for 2 hr to HOPG functionalized with the stated surface chemistry of diyne PE vacuum dried prior to exposure to reaction solution.

To compare growth characteristics, substrates functionalized with each type of template chemistry were exposed to aged growth solution (5× dilution, aged for 12 hr, FIGS. 8A-8H), for either 15 minutes (FIGS. 8A, 8C, 8E, and 8G) or 2 hours (FIGS. 8B, 8D, 8F, and 8H). For all three templates, significant wire densities are achieved after 15 minutes. Both number density and wire length increase somewhat between 15 minutes and 2 hours. For instance, for 4,6-PCD-NH$_2$, average wire length increases from 55±14 nm at 15 minutes (FIG. 8a), to 83±27 nm after 2 hours (FIG. 8B).

Most noticeable is the difference in wire groupings on templates of single-chain amphiphiles (FIGS. 8A-8D) and dual-chain amphiphiles (FIGS. 8E-8H). On single-chain template, wires frequently form tightly packed groupings similar to those shown in FIG. 7. In contrast, on diyne PE templates, wires appear well-separated. For diyne PE templates only, we also found that drying the substrates under vacuum for ~10 minute prior to wire growth greatly increased the surface density of wires (FIGS. 8G-8H), consistent with the strongly wettable headgroup chemistry.

Anisotropic Growth of Au NWs on the 3-Micron Scale.

Figure 9A:
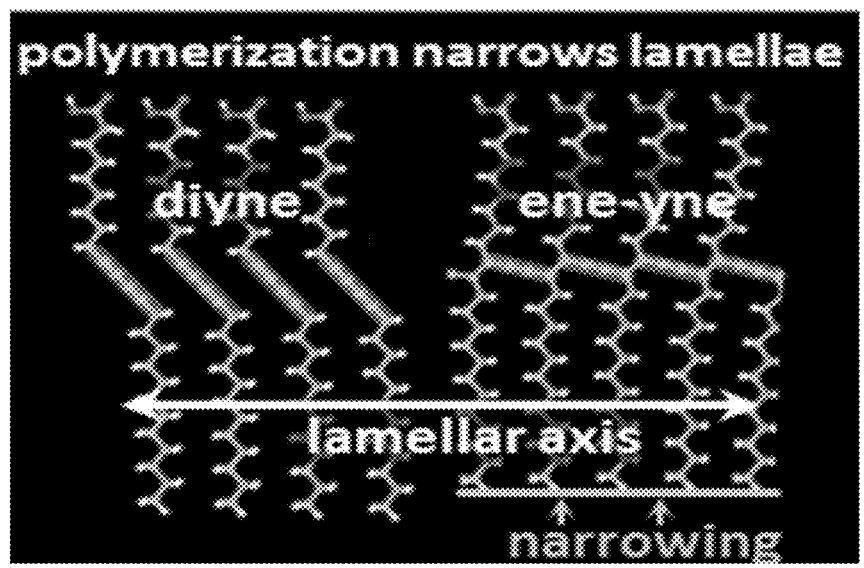
FIG. 9A shows a molecular model illustrating lamellar narrowing that leads to observed cracking.
Figure 9B:
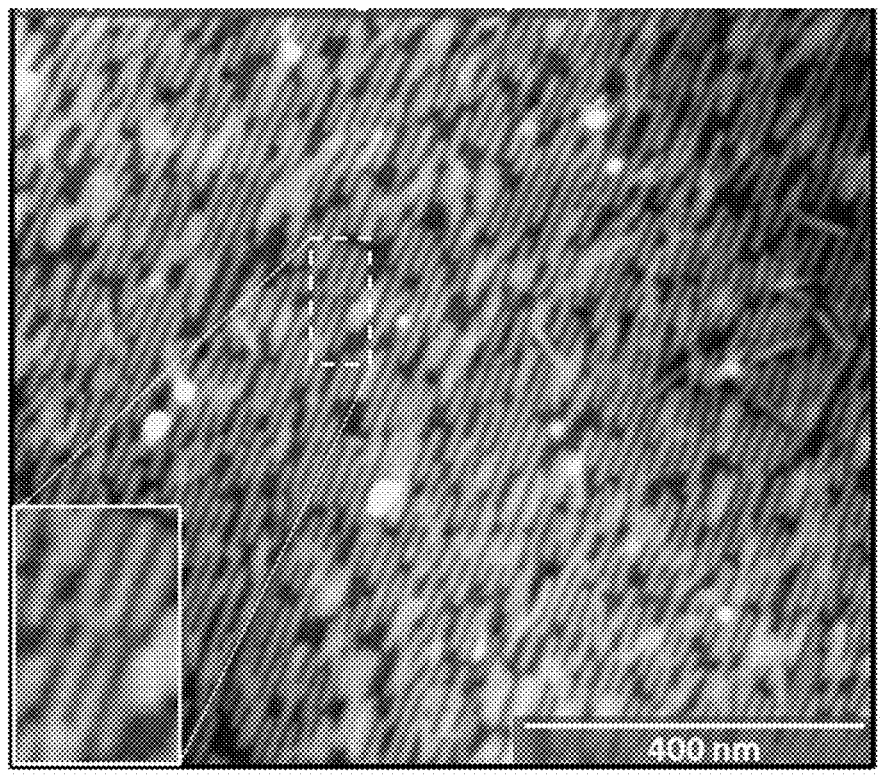
FIG. 9B depicts a scanning electron microscope (SEM) image showing long-range alignment in diyne PE template, with HOPG functionalized with diyne PE after 2 hr wire growth in 12 hr aged solution: 1-μm image showing details of wire orientation.

We have recently demonstrated that diyne PE can be assembled into very large ordered domains with edge lengths of several micrometers, through the use of in situ thermal annealing during LS transfer (Hayes, T. R., et al., 2017). FIGS. 9A-9B show an SEM image of a diyne PE monolayer prepared under such conditions. Linear defects form in the monolayer under the SEM electron beam due to slight lamellar narrowing as the diyne rehybridizes to form the ene-yne polymer backbone; the alignment of these defects reflects the local lamellar axis alignment within the monolayer, and thus illustrate domain ordering.

Wire growth on vacuum-dried diyne PE monolayers with large domain sizes produces arrays of wires with long-range ordering. FIG. 9B shows a higher-resolution AFM image acquired, illustrating the high degree of wire alignment. Wires appear to exhibit a regular spacing in most cases, as would be expected based on templated interactions with the substrate. Interestingly, line scans across sets of wires that exhibit regular spacing indicate that the average wire-wire distance is approximately 14 nm. The measured lamellar periodicity of the diyne PE templates under the same instrument conditions is 6.8 nm. Thus, a wire-wire distance of ~14 nm suggests wires template on alternating rows of diyne PE headgroups with remarkable regularity.

In several areas of the image shown, registry shifts are evident (FIG. 9c inset), with limited interpenetration of adjacent sets of wires. Such growth patterns are especially surprising given that the total diameter of a wire (~1.7 nm) and its OM ligand shell (2×2.2 nm=4.4 nm) would be approximately equal to the template periodicity, and the fact that solution phase growth in fact relies heavily on interdigitation of OM ligand shells to stabilize growing wires. In contrast, in growth on the diyne PE template surface, tight-packing appears to be actively discouraged.

Figure 10A:
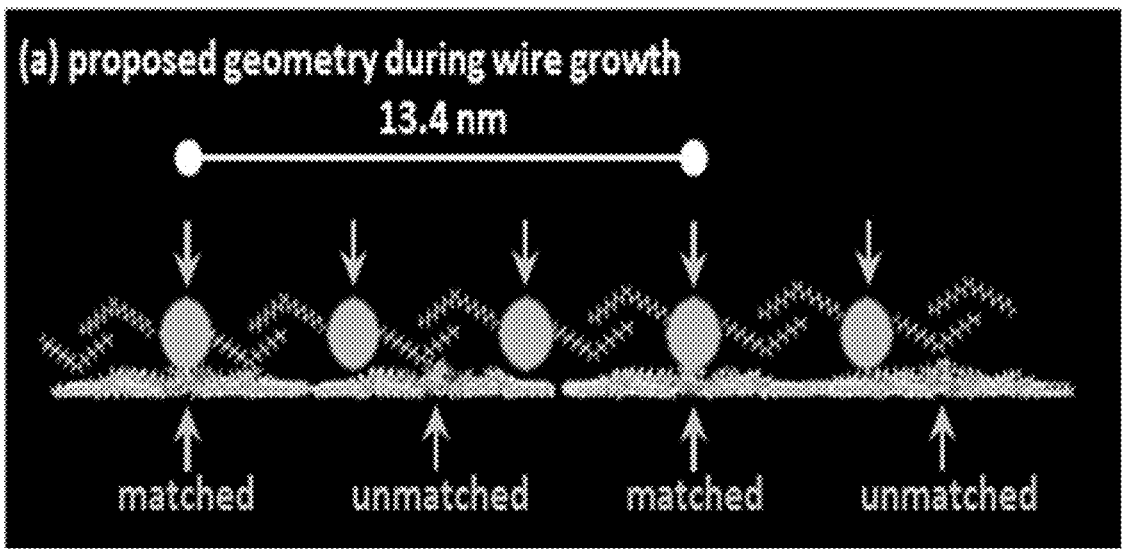
FIG. 10A shows a model of proposed wire growth pattern leading to staggered wire arrangement observed on diyne PE. For visual clarity, a single pair of oleylamine ligands is shown for each wire to illustrate ligand interdigitation.

We rationalize this experimental observation by considering the surface growth patterns that would be likely to lead to a preferred spacing of ~14 nm. One possibility that would be consistent with our observations is that the space between each pair of visible wires is occupied during the growth phase by two additional wires as shown in FIG. 10A. Such an arrangement would lead to tightly interdigitated ligand shells, consistent with solution-phase growth patterns observed previously. Such an arrangement could plausibly prevent either of the two center wires from accessing the center template stripe, and simultaneously produce the types of Y-shaped junctions observed in the FIG. 9B inset.

Solution-phase growth experiments conducted previously have produced wire bundles with interwire spacings as great as 9 nm, presumed to be due to the presence of multiple layers of oleylamine and n-hexane in each ligand shell. While such an arrangement could also be possible here, it is less clear that multiple ligand layers would routinely lead to preferred interwire spacings as great as 14 nm, or that they would actively prevent a wire in an adjacent set from continuing growth along the center template stripe.

Figure 10B:
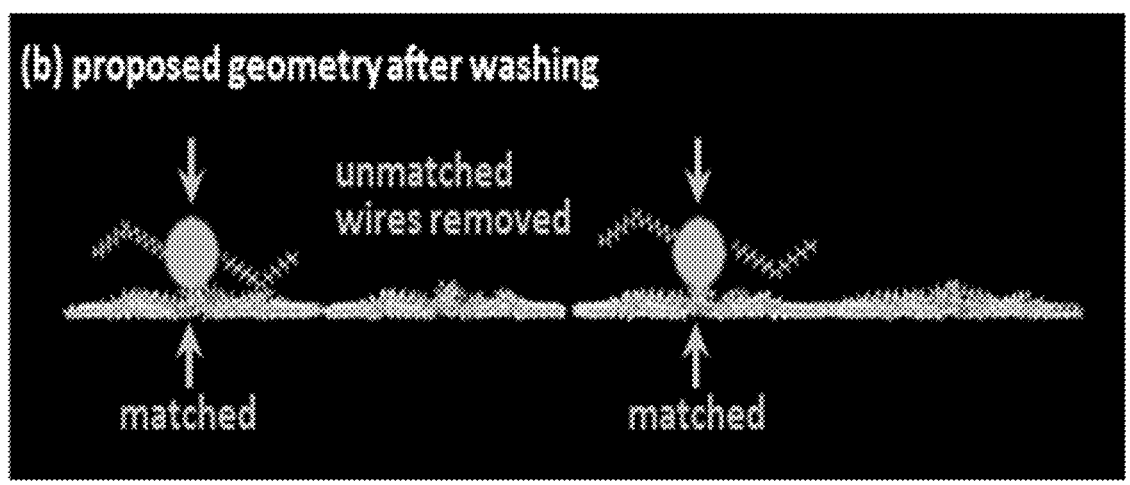
FIG. 10B shows a model in which wires not connected to template headgroups are removed, to illustrate likely effects of washing the surface after growth.

Template surfaces are washed with several mL of cyclohexane prior to imaging; without extensive washing, the surface is extremely difficult to image. The aim of washing is to remove loosely bound material from the surface; in the context of the experiments performed here, we believe that wires bound to rows of headgroups are retained the surface, while those that are adsorbed through interdigitated ligand shells are removed as shown in FIG. 10B. We note that under similar growth conditions, the single-chain amphiphiles tested are much more likely to form areas of tightly packed wires that are not removed by washing. This difference would be consistent with increased mobility of the headgroups on single-chain amphiphiles, in comparison with the phospholipid headgroups, in which motion beyond the range of the flexible ethyl bridge requires two chains to lift from the surface simultaneously.

Figure 11:
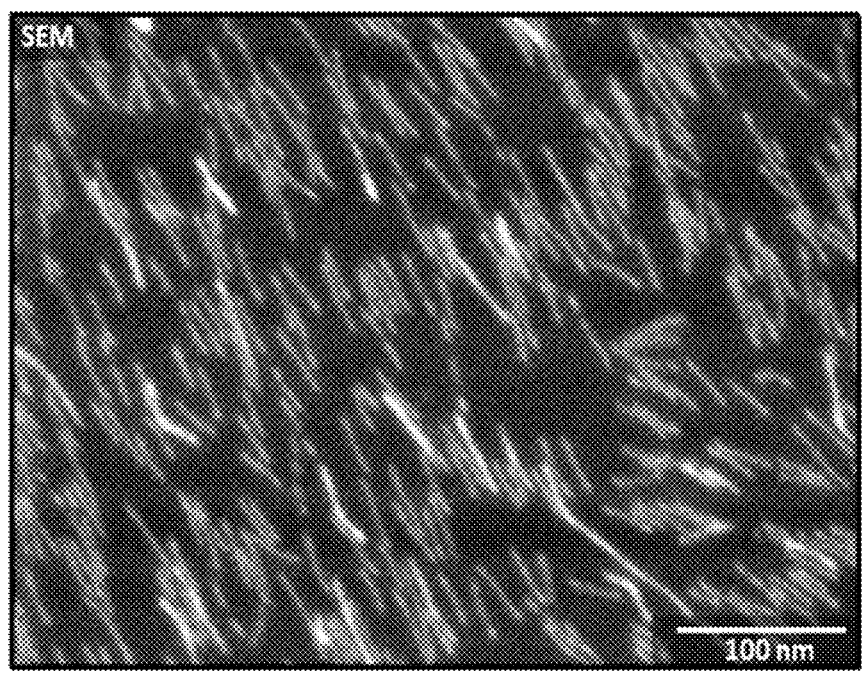
FIG. 11 shows a scanning electron microscope (SEM) image of wires grown in a solvent mixture of 99:1 (cyclohexane:n-hexane), illustrating decreased average wire-wire distances.

Because n-hexane is understood to interdigitate in the OM ligand shell during solution-phase wire growth, we examined the impact of adding small amounts of n-hexane to the growth solution. FIG. 11 shows that different wire growth patterns are observed in a solvent mixture of 99:1 cyclohexane:n-hexane.

Overall, we find that gold nanowires can be controllably grown on templates of polymerized amphiphiles, and that structural differences between amine-terminated ligands can be used to modulate wire growth patterns. Taken together, these findings suggest the capability to use noncovalent ligand templates to structure growth of inorganic materials on 2D materials. Importantly, the finding that it is possible to selectively target alternating rows of template headgroups suggests the possibility of controlling pitch in assemble inorganic nano structures across a broader range of length scales than those available through either template ligand or nanocrystal individually. Such a capability would be important in the development of templated nano structure assemblies for applications including plasmonically coupled arrays, in which coupling is sensitive to both orientation and distance between particles.

Experimental Methods

Materials.

4-Pentynoic acid, 10,12-pentacosadiynoic acid, iodine, copper chloride, potassium hydroxide, hydroxylamine hydrochloride, ethylamine, sulfuric acid, sodium thiosulfate, sodium bicarbonate, sodium sulfate, tetrahydrofuran (THF), oleylamine, triisopropylsilane, lithium aluminum hydride, and ammonium hydroxide were purchased from Sigma Aldrich (location) and used as received. 1-Eicosyne was purchased from GFS Chemicals (location) and used as received. Methanol, diethyl ether, hexanes, and toluene were purchased from Fisher (location) and used as received. Cyclohexane and gold (III) chloride trihydrate were purchased from Acros Organics (loc) and used as received. Silica gel was purchased from Machery Nagel (loc) and used as received. Reagents 10,12-pentacosadiynoic acid, ethylamine, oxalyl chloride, tetrahydrofuran (THF), lithium aluminum hydride, N-hydroxysuccinimide, N-(3-dimethylaminopropyl)-N'-ethylcarbodiimide hydrochloride, and ammonium hydroxide were purchased from Sigma Aldrich (Saint Louis, Mo.) and used as received. Methanol, diethyl ether, and dichloromethane (DCM), tetrahydrofuran (THF), ethyl acetate, ammonium chloride, sodium bicarbonate, sodium sulfate, sodium chloride, and magnesium sulfate were purchased from Fisher (Fair Lawn, N.J.) and used as received. Silica gel was purchased from Machery Nagel (Bethlehem, Pa.) and used as received.

Instrumentation.

$^1$H NMR spectra were acquired using an INOVA Varian 300 MHz with a Varian 5-mm 4-nucleus/BB Z-gradient probe (company, location). All mass spectra were acquired using a Thermo-Finnigan LTQ (San Jose, Calif.) ion trap mass spectrometer, with a nanoESI ionization source. All atomic force microscopy images were acquired on a Veeco multimode AFM with NanoScope V controller or an Asylum Cypher ES AFM.

Synthesis of 1-bromo-1-eicosyne.

Synthesis of 1-bromo-1-eicosyne was adapted from a previously published procedure, (citation) described briefly here. In a typical reaction, 1-eicosyne (3.6 mmol) was added to acetone (18 mL), followed by the addition of silver nitrate (0.36 mmol) and N-bromosuccinimide (3.96 mmol). The reaction mixture was stirred for 3 hours under ambient conditions, then diluted with 100 mL of hexanes and filtered. The filtrate was reduced in volume and passed through a small silica plug with hexanes. The product was reduced in volume to afford the final product as a colorless oil (typical yield 75%).

Synthesis of 4,6-pentacosadiynamine.

4-pentyn-1-amine (1.911 mmol) was dissolved in a 1M KOH solution (1.8 mL). Methanol (10 mL), hydroxylamine hydrochloride (0.182 mmol), and a solution of copper chloride dihydrate (0.456 mmol) dissolved in ethylamine (3 mL). The reaction mixture was then cooled to −78° C. Subsequently, a solution of 1-bromo-eicosyne (1.82 mmol) dissolved in THF (3 mL) was added dropwise, causing a precipitate to form. The reaction mixture was allowed to warm to room temperature and the reaction continued at that temperature for 24 hours. If the solution turned blue, additional aliquots of hydroxylamine hydrochloride were added. The reaction was then quenched by addition of a 10% aqueous solution of sulfuric acid. Crude product was extracted with diethyl ether (3×50 mL) and then washed with water (3×50 mL) and brine (3×50 mL). The organic layer was subsequently dried over anhydrous $Na_2SO_4$, filtered, and the ether removed by rotary evaporator. The product was purified on a silica column with a mobile phase of 9:1 $CHCl_3$:MeOH followed by 2% ammonium hydroxide in 9:1 $CHCl_3$:MeOH.

Synthesis of 10,12-pentacosadiynamine.

The two-step reaction was adapted from a protocol reported previously (Kootery, K. P., et al., *ACS Appl. Mater. Interfaces* 2014, 6(11), 8613-8620). In a typical reaction 10,12 pentacosadiynoic acid (PCDA) (1.88 mmol) was dissolved in DCM (25 mL) followed by the addition of oxalyl chloride (26.33 mmol) under nitrogen atmosphere. Several drops of DMF was added. The mixture was stirred at room temperature overnight. The solvent was removed and the crude product was dissolved in dry THF (25 mL). This solution was then added dropwise into a solution of 38 mL of ammonium hydroxide (25%) in an ice bath overnight. The solvent was evaporated and then extracted with DCM three time and then dried over $MgSO_4$.

The product isolated from the reaction described above was dissolved in 100 mL of diethyl ether in an ice bath. $LiAlH_4$ (17.9 mmol) was added to the chilled solution. The solution was stirred overnight and the organic layer was extracted with a saturated $NH_4Cl$ solution. The aqueous layer was extracted with ethyl acetate. Both organic layers were then combined and dried over $MgSO_4$. The filtered residue was purified with a silica column with an initial mobile phase of 9:1 $CHCl_3$:MeOH followed by 2% ammonium hydroxide in 9:1 $CHCl_3$:MeOH.

Procedure for LS Transfer of Amphiphile Monolayer.

LS deposition was performed using a Kibron Langmuir-Blodgett trough (Kibron, Helsinki, Finland). For transfer of single chain amphiphiles, 12 µL of a 0.75 mg/mL solution of the amphiphile in chloroform was deposited onto a subphase of deionized water at 30° C. For phospholipid monolayers, deposition was performed by spreading 30 µL of 0.50 mg/mL solution in chloroform on a subphase of 5 mM $MnCl_2$ at 30° C. After deposition, the trough was allowed to equilibrate for 30 minutes, in order to allow the chloroform from the spreading solution to evaporate; the trough barriers were then slowly swept inwards at a rate of 6 mm/min. Once the barriers reached 75 Å$^2$/chain for the single chain amphiphile, the HOPG substrate was lowered at a speed of 2 mm/min using a continuous heater at 45° C. onto the subphase parallel to the liquid interface. After 4 minutes in contact with the liquid interface the HOPG was slowly lifted out at the same speed. For the phospholipid when the surface pressure reached 30 mN/m, the freshly cleaved HOPG was lowered into the interface using the continuous heater at 70° C. The HOPG was left in contact with the interface for 2 mins and removed from the interface using the automatic dipper. All samples where dried with nitrogen to remove any excess water.

All diacetylene-functionalized amphiphiles monolayers prepared were photopolymerized for 1 hour via irradiation under a 254-nm 8-W UW lamp with approximately 4 cm distances between sample and lamp.

Surface Templated Wire Growth.

In a typical reaction (0.262-2.62 mM) $HAuCl_4.3H_2O$ was added to (9.16-91.6 M) of cyclohexane followed by (10.32-103 mM) of oleylamine. The solution was stirred on a vortex at room temperature. Triisopropylsilane (23.7-237 mmol) was added next to the solution was stirred again. The mole ratio between all three reactants $HAuCl_4.3H_2O$, oleylamine, and TIPS remained the same at 1:39.4:90.5 ratio. The reaction mixture was immediately transferred to a beaker, monolayer templated substrate was either lowered into the liquid interface using a manual translation stage or allowed to age prior to contact with the substrate. A rubber stopper is then placed on the top of the beaker to limit evaporation. The solution was kept still at ambient temperature for 6 to 16 hours. The sample was removed from the solution was washed with (37.0-139 mM) of cyclohexane and dried with nitrogen. All substrates where stored at 4° C. post wire growth to prevent degradation and reordering of the wires.

In an illustrative embodiment, 1.25 mg of $HAuCl_4.3H_2O$ was added to 6 mL of cyclohexane followed by 42 uL of oleylamine. The solution was stirred on a vortex at room temperature. Triisopropylsilane (59 uL) was added next to the solution was stirred again. The reaction mixture was immediately transferred to a beaker, monolayer templated substrate was lowered into the liquid interface using a manual translation stage. A rubber stopper is then placed on the top of the beaker to limit evaporation. The solution was kept still at ambient temperature for 12 hours. The sample was removed from the solution was washed with 10 mL of cyclohexane and dried with nitrogen. Dilution experiments followed the same procedure expect the volume of solvent varies (4 mL, 6 mL, 8 mL, or 16 mL). All substrates where stored at 4° C.

Purification of Au NW Growth Solution.

The growth solution wires where harvested by centrifugation at 600 rpm for 30 mins in a 1:1 cyclohexane/ethanol solvent mixture. This procedure was repeated twice in order remove excess oleylamine and silane. Finally, the product was redispersed in cyclohexane and stored at 4° C.

AFM Imaging.

All AFM imaging was performed under ambient conditions in air using either a Veeco Multimode (Bruker Instruments, Billerica, Mass.) instrument or Agilent 5500 Scanning Probe Microscope (Agilent, Palo Alto, Calif.). Imaging was performed in tapping mode with Bruker RFESP-75 tips (nominal force constant 3 N/m and radius of curvature <10 nm). Tip broadening was corrected using the equation $2x=4\sqrt{(R_{tip}*R_{sample})}$. Where x equals the corrected radius and R_tip is equal to 8 to 12 nm.

TEM Imaging.

All TEM imaging was performed on a Tecnai G2 20 with an accelerating voltage of 200 KV and a LaB6 filament.

Molecular Modeling.

Software packages Maestro and Macromodel (Schrödinger, Cambridge, Mass.) were used, respectively, to visualize the structures of phospholipids and fatty acids on graphene and to perform the force field minimizations and molecular dynamics simulations. All models were simulated using the OPLS_2005 force field, with no solvent file and extended cutoffs for van der Waals, electrostatic, and hydrogen-bonding interactions. Minimizations were performed using the Polak-Ribiere conjugate gradient (PRCG) algorithm and gradient method with 50 000 runs and a convergence threshold of 0.05. Most minimizations converged in less than 10 000 runs. For all calculations, atoms in the graphene sheets were frozen, to more closely mimic the structure of HOPG. Thus, while they contributed to the forces present in the system, their positions did not change in response to conformational changes of the adsorbed amphiphiles. For models demonstrating the amphiphile head group height profile, a bilayer of 1680 water molecules was placed on top of the amphiphile monolayers during minimization to more accurately simulate headgroup orientations under hydrated conditions, since the presence of explicit water has been shown previously to impact final minimized geometry in comparison with the use of a solvent force field.[35] Simulations of PCDA and diyne PC under glycerol were performed in the same manner, with the exception that the water bilayer was replaced with a glycerol layer comprised of 190 molecules. After minimization, molecular dynamics were run with the SHAKE protocol (bonds to hydrogen), a 1.5 fs step time, 10 ps equilibration time and 1000 ps simulation time with a temperature of 293 K.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A method for preparing a nanowire or nanorod on a non-covalently functionalized supporting 2D material substrate comprising the steps of
   a. preparing a supporting 2D material substrate;
   b. functionalizing said supporting 2D material substrate by preparing a monolayer or thin film comprising the step of assembling a polymerizable amphiphile comprising both hydrophobic and hydrophilic constituents on said supporting 2D material substrate, and then polymerizing said amphiphile to afford said monolayer or thin film;
   c. preparing a salt solution or suspension; and
   d. growing a nanowire or nanorod by exposing the salt solution or suspension to said monolayer or thin film on said supporting 2D material substrate.

2. The method of claim 1, wherein said salt is a metal salt.

3. The method of claim 2, wherein said metal salt is a gold or silver salt.

4. The method of claim 1, wherein said salt solution or suspension comprises a non-polar solvent or a mixture thereof.

5. The method of claim 1, wherein said salt solution or suspension comprises a cyclohexane solvent mixed with oleylamine, triisopropylsilane and a gold salt.

6. The method of claim 5, wherein said gold salt is $HAuCl_4 \cdot 3H_2O$.

7. The method of claim 5, wherein said cyclohexane solution comprises about 1-1000 mM of oleylamine.

8. The method of claim 5, wherein said cyclohexane solution comprises about 10-1000 mM of triisopropylsilane.

9. The method of claim 5, wherein said cyclohexane solution comprises about 0.1-10 mM of a gold salt.

10. The method of claim 1, wherein said polymerization of an amphiphile monolayer or thin film is performed by irradiating with an UV light.

11. The method of claim 1, wherein said supporting 2D material substrate is graphene, highly oriented pyrolytic graphite (HOPG), or a layered material of $MoS_2$ or $WS_2$.

12. The method of claim 1, wherein said polymerizable amphiphile is a lipid.

13. The method of claim 12, wherein said lipid is a polymerizable phospholipid.

14. The method of claim 12 wherein said polymerizable amphiphile is a single-chain fatty amine or dual-chain phospholipid with a terminal amine.

15. The method of claim 14, wherein said polymerizable single-chain amphiphile is 4,6-pentacosadiyneamine or 10,12-pentacosa-diyneamine.

16. The method of claim 14, wherein said dual-chain amphiphile is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE).

17. A method for preparing a nanowire or nanorod on a non-covalently functionalized supporting 2D material substrate comprising the steps of
 a. preparing a supporting 2D material substrate;
 b. functionalizing said supporting 2D material substrate by preparing a monolayer or thin film on said supporting 2D material substrate comprising the step of assembling a polymerizable amphiphile comprising both hydrophobic and hydrophilic constituents on said supporting 2D material substrate, and then polymerizing said amphiphile to afford said monolayer or thin film;
 c. preparing a metal salt dissolved or dispersed in a nonpolar medium; and
 d. growing a nanowire or nanorod by exposing the salt solution or suspension to said monolayer or thin film on said supporting 2D material substrate.

18. The method of claim 17, wherein said metal salt is a silver or gold salt.

19. The method of claim 17, wherein said supporting 2D material substrate is graphene, highly oriented pyrolytic graphite (HOPG), or a layered material such as $MoS_2$ or $WS_2$.

\* \* \* \* \*